United States Patent
Ojan

(10) Patent No.: US 11,206,952 B2
(45) Date of Patent: Dec. 28, 2021

(54) SANDWICH MAKING UTENSIL

(71) Applicant: Sahar Dawn Ojan, Warminster, PA (US)

(72) Inventor: Sahar Dawn Ojan, Warminster, PA (US)

( * ) Notice: Subject to any disclaimer, the term of this patent is extended or adjusted under 35 U.S.C. 154(b) by 405 days.

(21) Appl. No.: 16/276,539

(22) Filed: Feb. 14, 2019

(65) Prior Publication Data
US 2019/0254483 A1    Aug. 22, 2019

Related U.S. Application Data

(60) Provisional application No. 62/631,520, filed on Feb. 16, 2018.

(51) Int. Cl.
*A47J 43/28*    (2006.01)
*A21C 15/00*    (2006.01)
*A21D 13/32*    (2017.01)

(52) U.S. Cl.
CPC ............. *A47J 43/28* (2013.01); *A21C 15/007* (2013.01); *A21D 13/32* (2017.01)

(58) Field of Classification Search
CPC ......... A47J 43/28; A21C 15/007; A21D 13/32
See application file for complete search history.

(56) References Cited

U.S. PATENT DOCUMENTS

| | | | |
|---|---|---|---|
| 920,345 A | 5/1909 | Kolodziej | |
| 1,873,920 A | 8/1932 | Bemis | |
| 2,111,910 A | 3/1938 | Fisher | |
| 2,277,888 A | 3/1942 | Segal | |
| 2,652,087 A | 9/1953 | Turpin | |
| 2,925,110 A | 2/1960 | Bayers | |
| 3,539,354 A | 11/1970 | Colvin | |
| 3,994,213 A | 11/1976 | Brezinski | |
| 4,341,376 A | 7/1982 | Germinario | |
| 4,589,206 A * | 5/1986 | Marcoux | A21C 15/04 30/114 |
| 4,807,505 A | 2/1989 | Campbell et al. | |
| D315,275 S | 3/1991 | Aziz et al. | |
| D343,770 S | 2/1994 | McFarling et al. | |
| 5,499,578 A | 3/1996 | Payne | |
| 5,567,455 A | 10/1996 | Alsbrook, Sr. | |
| 5,832,800 A | 11/1998 | Donoghue | |
| 6,224,928 B1 | 5/2001 | Jacobbi | |
| 7,216,574 B2 * | 5/2007 | Woods | B26D 3/30 30/278 |
| 8,215,218 B2 * | 7/2012 | Al-Heraibi | B26D 1/30 83/454 |
| 2018/0184849 A1 | 7/2018 | Hayward et al. | |
| 2020/0323395 A1 | 10/2020 | Ojan | |

* cited by examiner

*Primary Examiner* — Omar Flores Sanchez

(57) ABSTRACT

A sandwich making utensil includes a bread support for supporting a sandwich bread and two or more clips for holding the sandwich bread in the open configuration while fillings are added to the sandwich bread. In some embodiments, the bread support may be telescoping, foldable, flat, tub-shaped, or any combination of these.

18 Claims, 34 Drawing Sheets

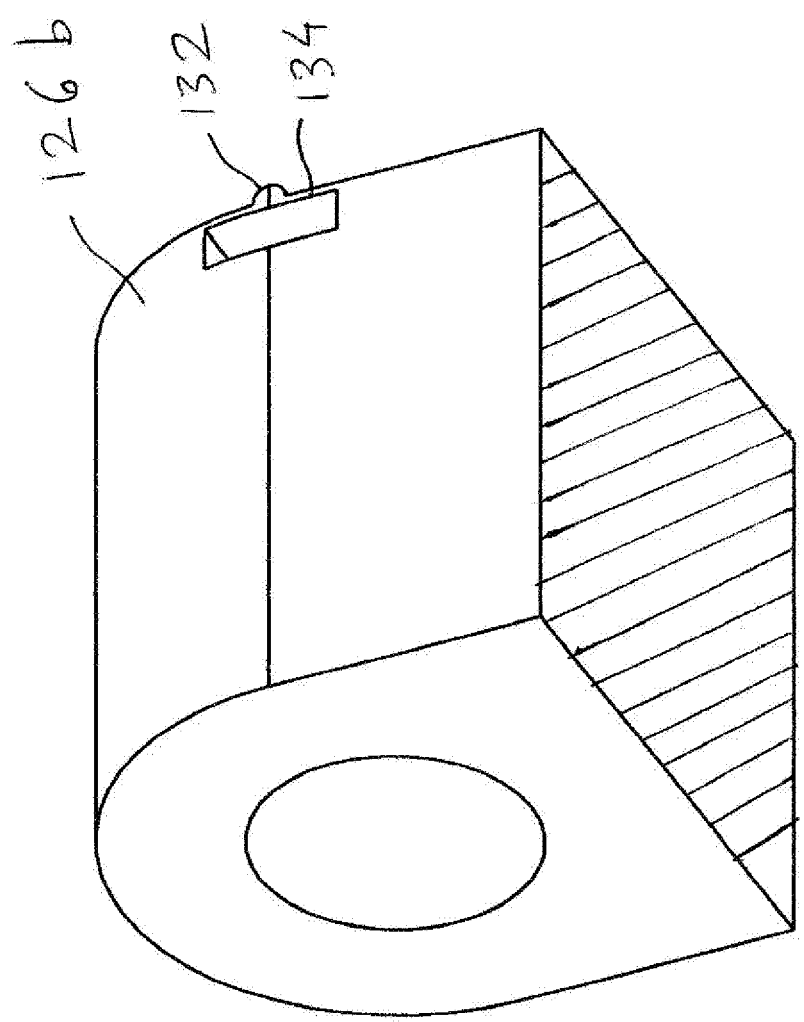

SANDWICH MAKING UTENSIL

CROSS-REFERENCE TO RELATED APPLICATIONS

This application claims the priority of United States Provisional Application for Patent No. 62/631,520, filed on Feb. 16, 2018, which is incorporated by reference herein in its entirety.

BACKGROUND OF THE INVENTION

1. Field of the Invention

The present invention relates to a utensil for holding elongated sandwich bread in a spread open configuration for adding filings such as meats, cheeses, vegetables, condiments, sauces, pickles and other accompaniments.

2. Description of the Prior Art

When making a sandwich using elongated bread types, such as baguettes, hoagie or sub rolls, and the like, it is customary to slice the bread along its length on one side and at least part way through the width of the bread at each end and then to spread the halves of the bread open in butterfly or pocket fashion. The bread can then be filled with filings such as meats, cheeses, vegetables, condiments, sauces, pickles and other accompaniments to make a sandwich. However, very often the halves of the bread have a tendency to spring back to the closed position, which makes it necessary for the person making the sandwich to use one hand to keep the bread halves spread apart and leaving one hand free for adding fillings to the sandwich. The necessity of using one hand to keep the bread halves apart adds to the difficulty of making the sandwich.

If the cut in the bread is extended far enough along the normally uncut side of the bread to reduce the tendency for the bread halves to spring back to the closed position, then it becomes likely that the bread halves will break apart completely with the result that the capability of the bread to contain the filings is lost. Accordingly, the inconvenience of the sandwich maker having to use one hand to keep the bread in the open configuration has persisted in the sandwich making art.

SUMMARY OF THE INVENTION

The present invention is directed to a sandwich making utensil that includes a support for supporting a sandwich bread and two or more clips for holding the sandwich bread in the spread-open configuration while fillings are added to the sandwich bread. In some embodiments the bread support may be telescoping, foldable, or both.

BRIEF DESCRIPTION OF THE DRAWINGS

FIGS. 23-34 are fragmentary views showing details of the clips and the detent mechanism for holding the clips of an embodiment of the Sandwich Making Utensil in the engaged position.

Similar reference characters denote corresponding features consistently throughout the attached drawings.

DETAILED DESCRIPTION OF THE PREFERRED EMBODIMENTS

Figure 1:
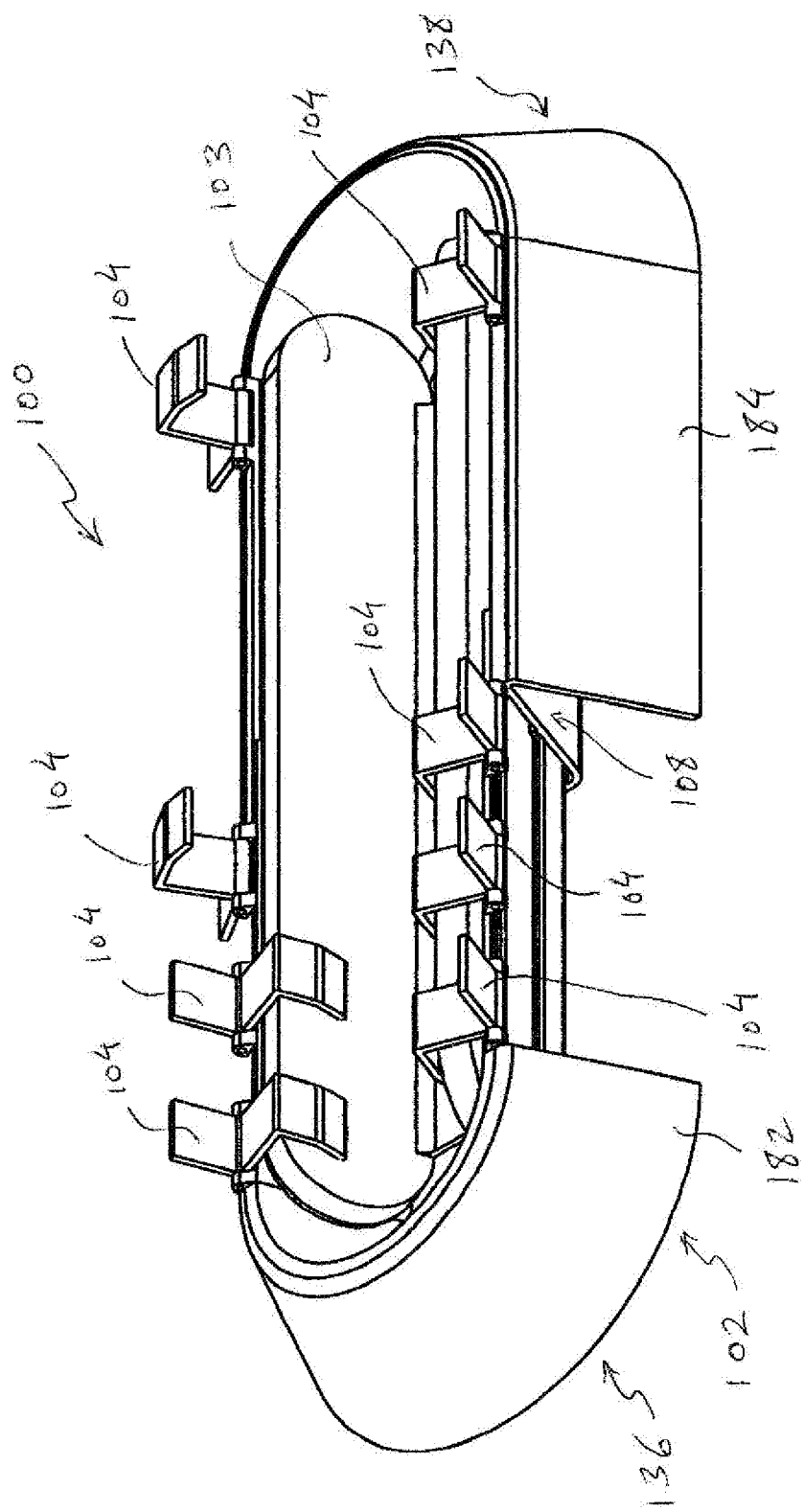
FIG. 1 is an environmental view of an embodiment of the Sandwich Making Utensil being used to hold a sandwich bread open.
Figure 2:
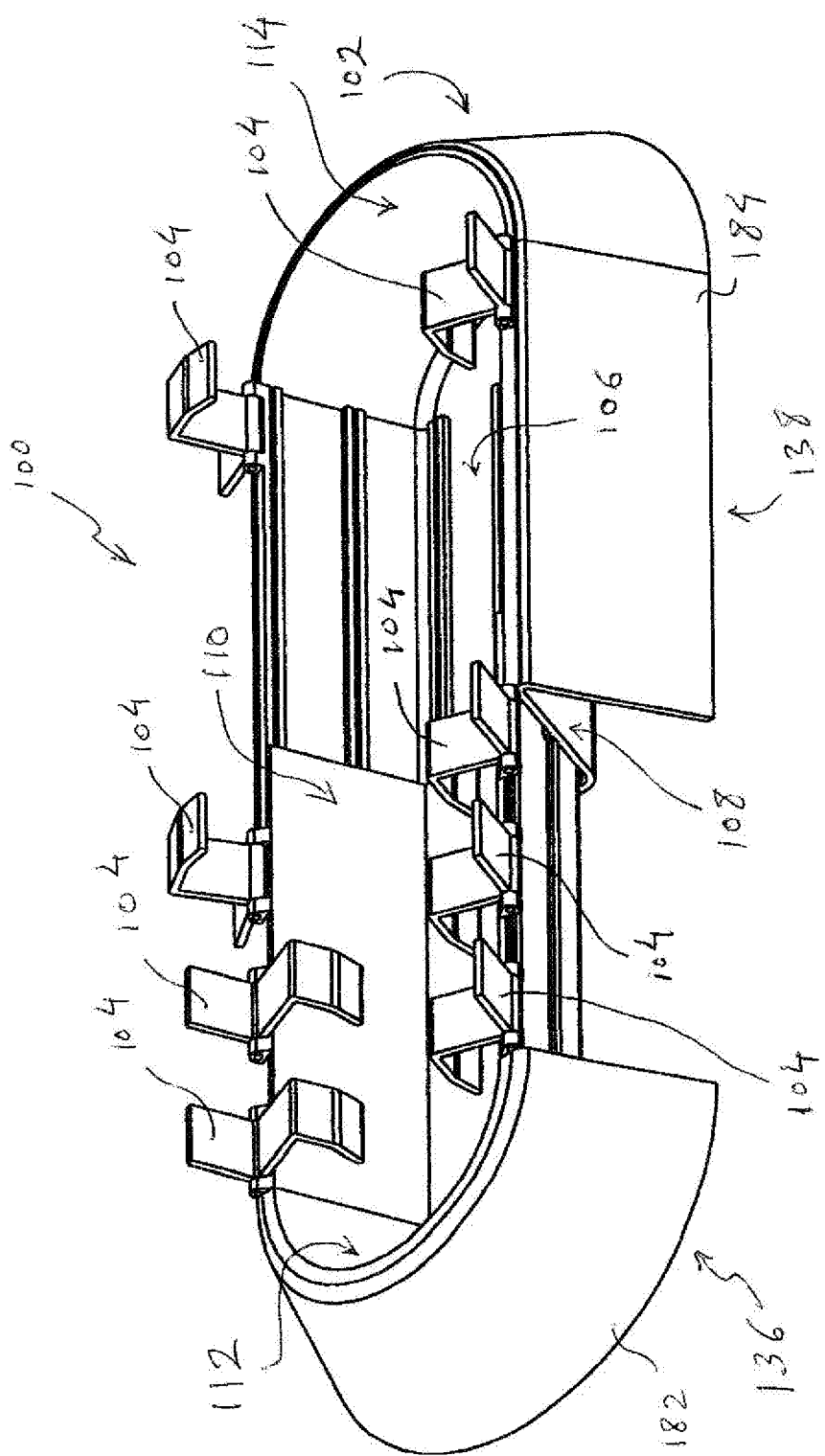
FIG. 2 is a perspective view of an embodiment of the Sandwich Making Utensil with the sandwich support extended to maximum length.
Figure 3:
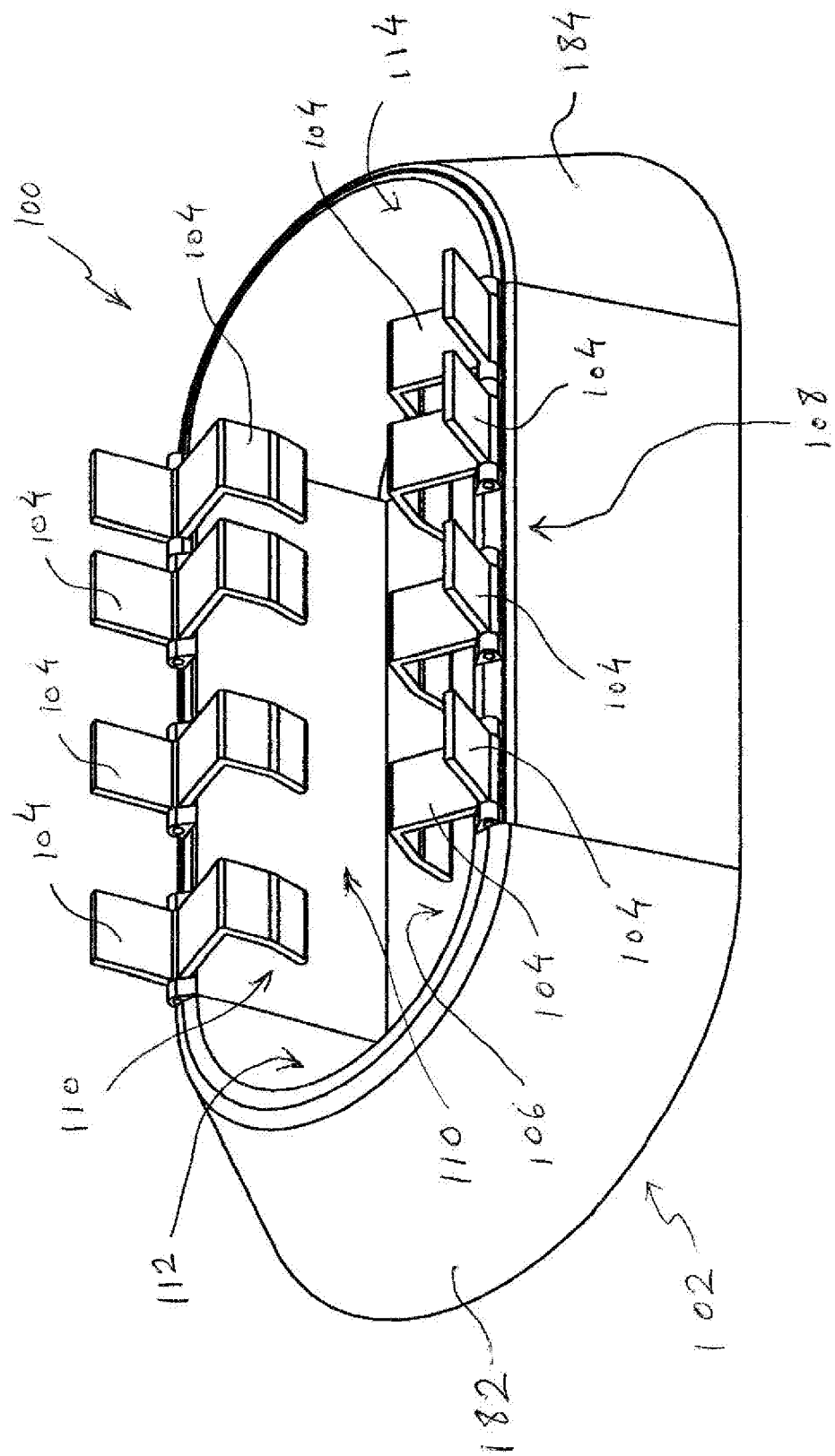
FIG. 3 is a perspective view of an embodiment of the Sandwich Making Utensil with the sandwich support contracted to minimum length.
Figure 4:
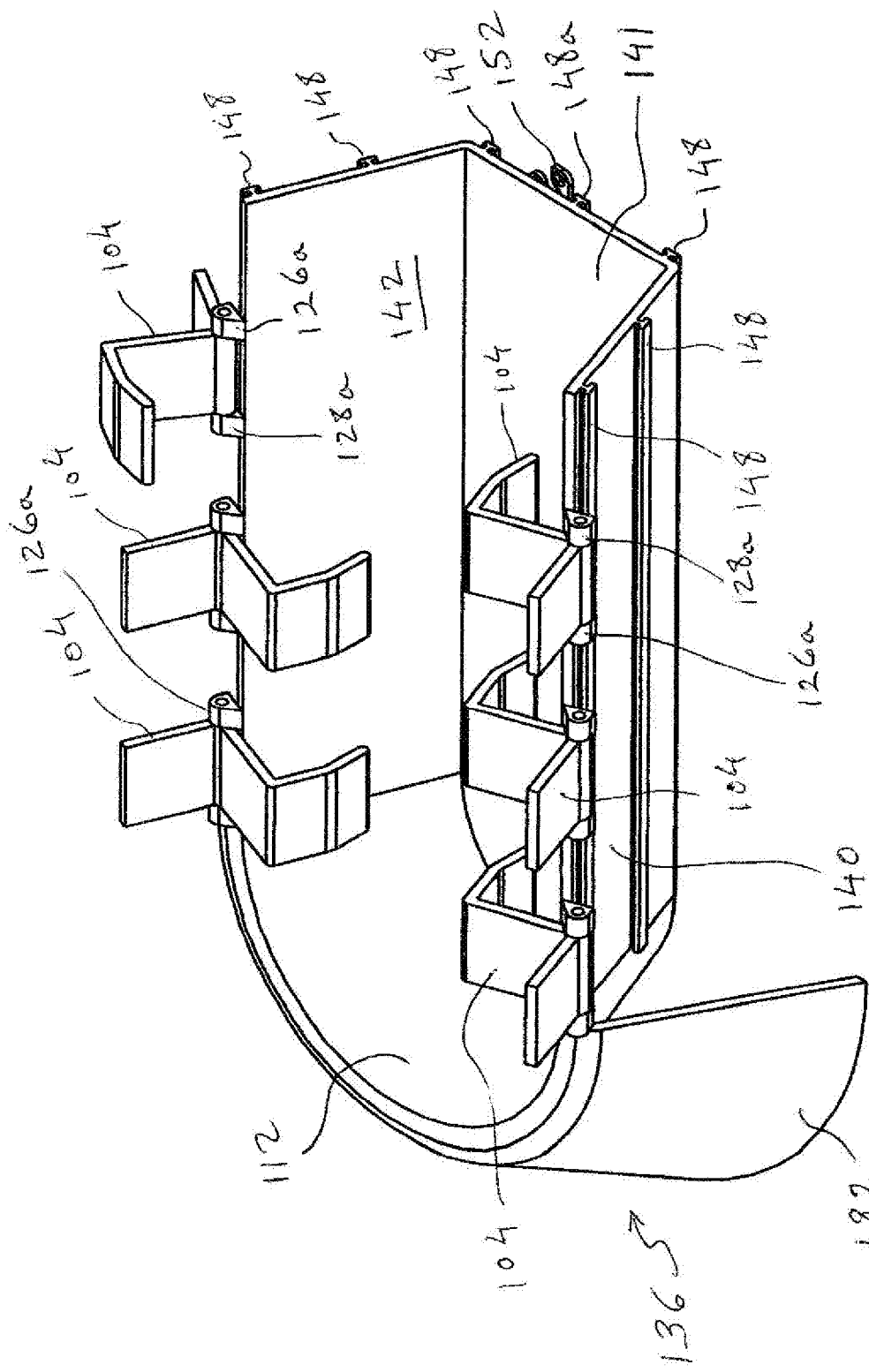
FIGS. 4-9 are views of the inner half of the bread support of an embodiment of the Sandwich Making Utensil, wherein the catch for selectively holding together the inner and outer halves of the bread support is also shown to illustrate the positional relationship of the catch to the rib 148*a* when the bread support is fully extended even though the catch and catch spring are attached to the outer half or outer part of the bread support.
Figure 5:
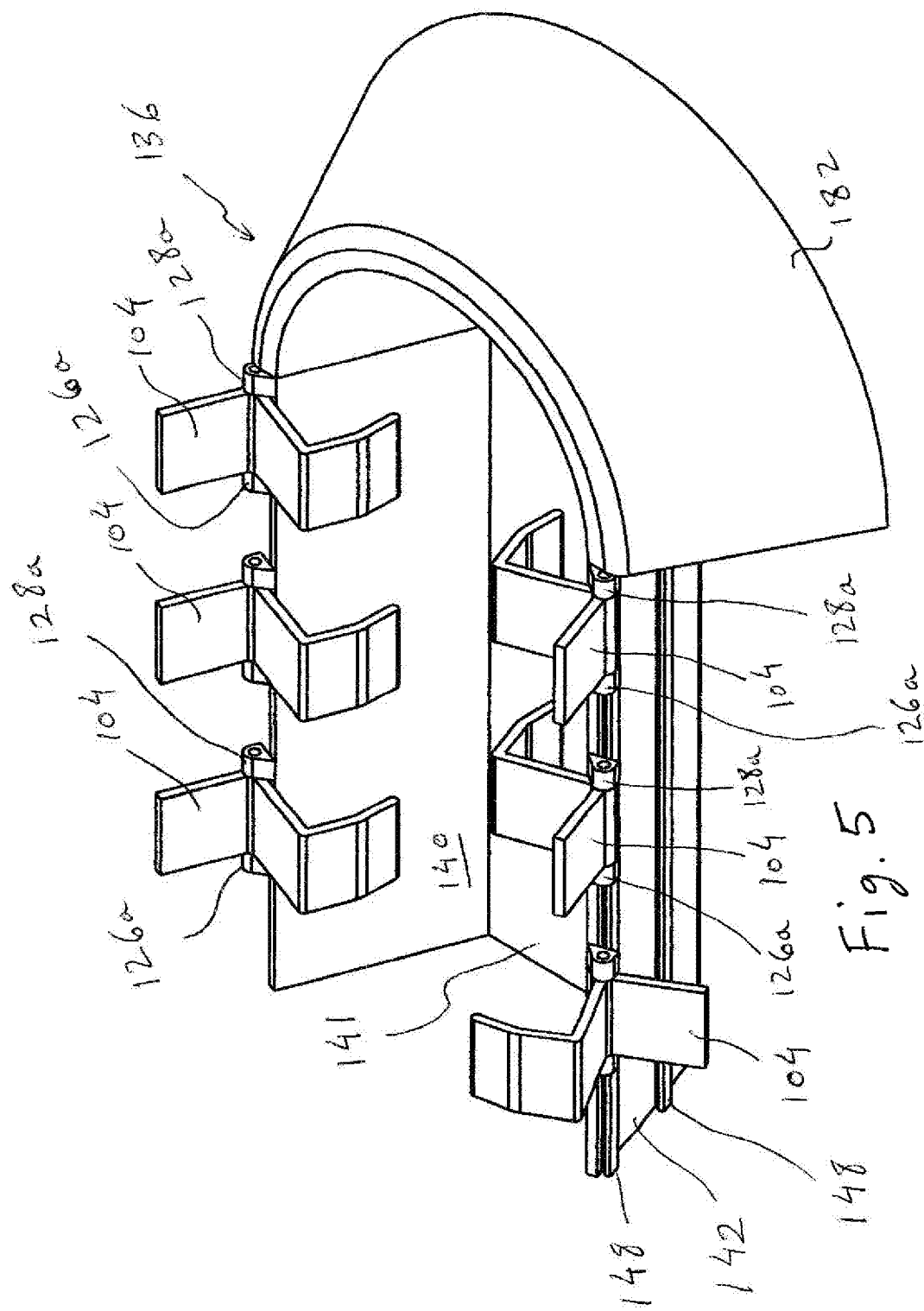
Figure 6:
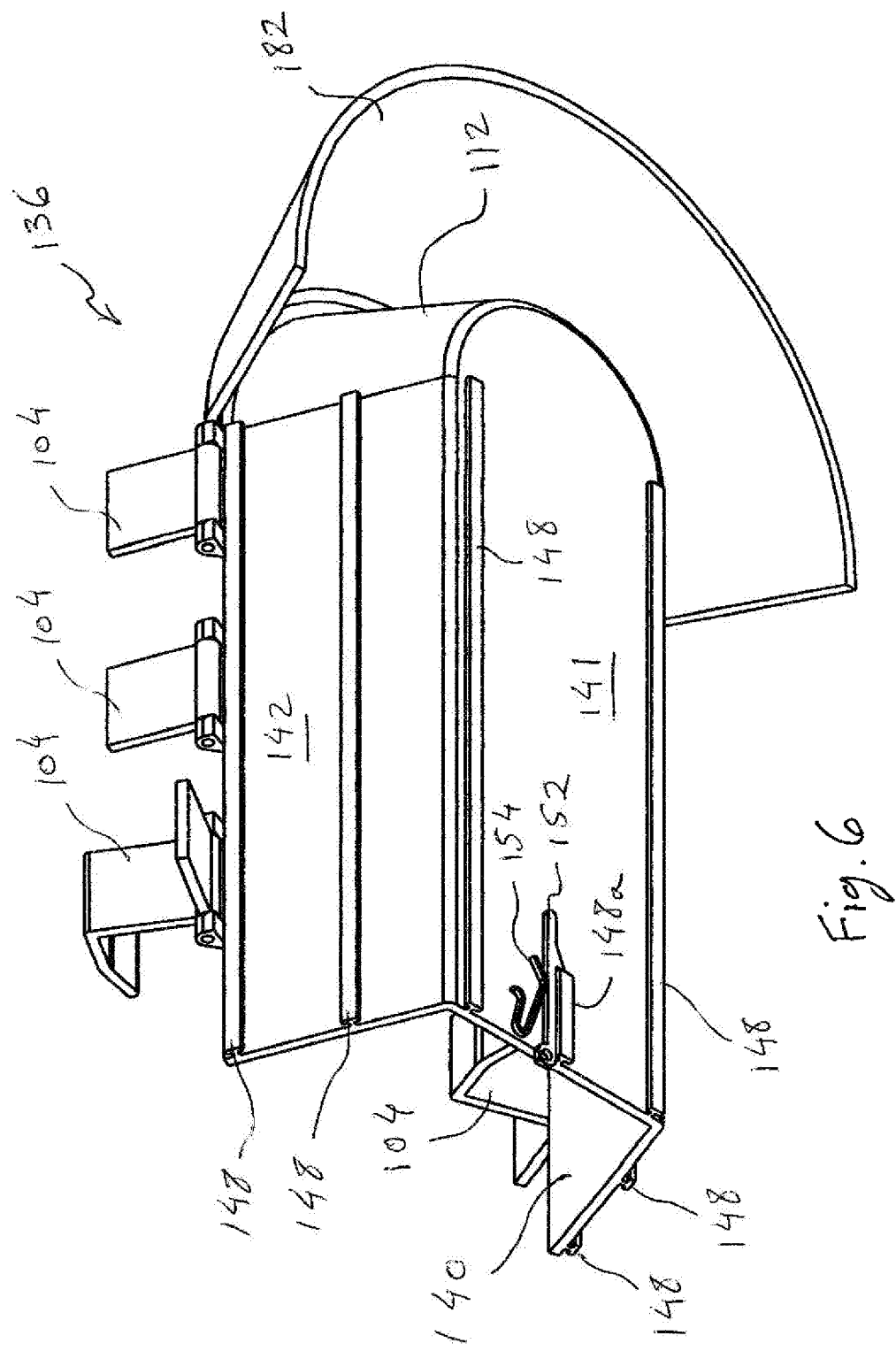
Figure 7:
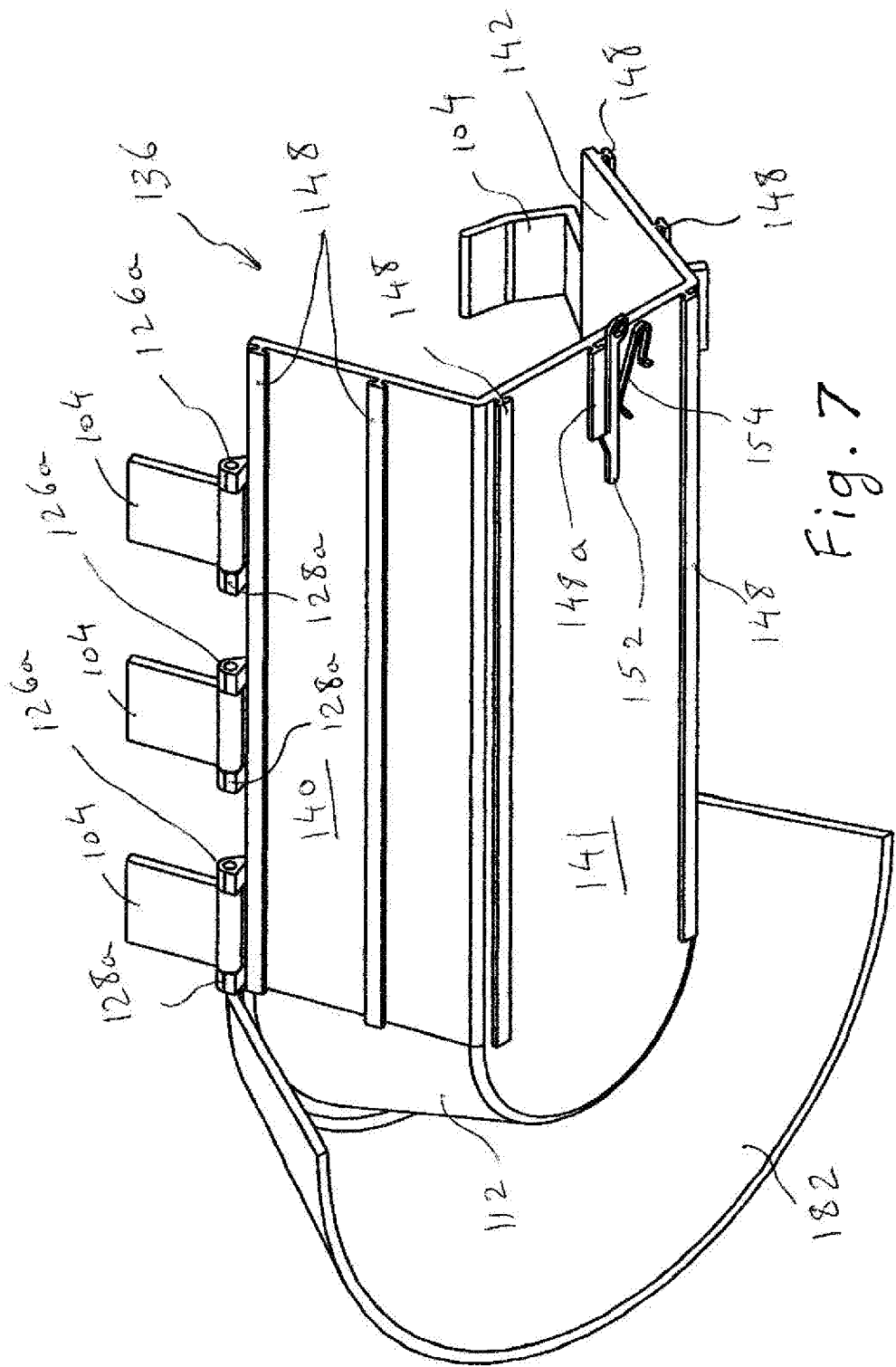

Referring to FIGS. 1-13, an embodiment 100 of the Sandwich Making Utensil can be seen. The Sandwich Making Utensil 100 includes a bread support 102 that can support an elongated sandwich bread 103 on a supporting surface such as a kitchen counter top. The Sandwich Making Utensil 100 also includes at least two clips 104 for holding the sandwich bread 103 in the open configuration to allow fillings to be added to the sandwich bread. The clips 104 are arranged on opposite sides of the bread support 102 such that each clip 104 is positioned on the opposite side of the bread support 102 from a corresponding clip 104. Preferably, the corresponding clip 104 is essentially the mirror image of its opposite clip, or the corresponding clip 104 may be exactly the same as the former or its opposite clip 104 but one that is rotated 180 degrees relative to the opposite clip about an axis perpendicular to the bottom of the bread support 102.

The bread support 102 may be telescopically extendable and retractable as desired between an extended configuration and a retracted configuration or any length in between to accommodate breads of different lengths. The extended configuration of the bread support 102 corresponds to its maximum length, and the retracted configuration of the bread support 102 corresponds to its minimum length. In the illustrated embodiment, the bread support 102 is in the form of a tub, and more specifically a telescoping tub, that has a bottom 106, side walls 108 and 110, and end walls 112 and 114.

Each of the clips 104 is pivotally movable between an engaged position and a disengaged position. When in the engaged position each clip 104 is capable of engaging the bread 103 proximate one side of the bread opening such that the clips 104 are capable of cooperatively maintaining the bread open for the addition of sandwich fillings when two or more of the clips are in the engaged position. Preferably, each clip 104 is provided with a detent mechanism for holding the clip in the engaged position until a person using the utensil 100 applies sufficient force to move the clip 104 to the disengaged position. The "engaged position" as used herein is intended to mean the operative position or state.

Each clip 104 has a pivoting arm 116 and a laterally extending member 118 capable of engaging the bread 103 on one side of the bread. Each clip 104 preferably also has an operating lever 120 to allow the person using the utensil 100 to more easily move the clip between the engaged and disengaged positions. Each clip 104 is supported for pivotal movement by a corresponding pivot shaft 122. Each clip 104 has a sleeve portion 124 provided at one end of its pivoting arm 116. The bread engaging member 118 of each clip 104 is attached to the pivoting arm 116 of each clip 104 at the end of the pivoting arm 116 that is opposite the end to which the sleeve portion 124 is attached. In the illustrated example, the pivoting arm 116 and the bread engaging member 118 of each clip 104 together form an approximately L-shaped cross section. The corresponding pivot shaft 122 passes through the sleeve portion 124 of each of the clips 104 and defines the pivot axis of each clip 104. On either side of the sleeve portion 124 of each clip 104, are projections 126a and 128a or 126b and 128b. The projections 126a, 128a, 126b, and 128b each have a cylindrical bore for receiving and supporting one end of the pivot shaft 122 of the corresponding clip 104. The projections 126a, 128a, 126b, and 128b are attached to the bread support 102. Adjacent projections 126a and/or 128a may be combined into a single extended projection to simplify manufacture. Adjacent projections 126b and/or 128b (not present in the illustrated embodiment) may also be combined into a single extended projection to simplify manufacture. The bread engaging member 118 is also referred to herein as the blocking member 118 because the blocking member is adapted to block a corresponding side of the opening in the bread 103 from moving to a position corresponding to a closed configuration of the bread when the clip 104 is in the engaged position, even though the member 118 conceivably may not be in actual engagement with the bread 103 in some cases even when the clip 104 is in the engaged position.

In the illustrated embodiment, each clip 104 is provided with a detent mechanism for holding the clip 104 in the engaged position such that a person using the utensil has to apply some effort to move the clip 104 out of the engaged position. The detent mechanism comprises a groove or recess 130 provided in the side or face of the sleeve portion 124 of the clip 104. The detent mechanism also includes a projection 132 that is resiliently biased into engagement with the groove 130 when the clip 104 is in the engaged position. To move the clip 104 out of the engaged position and toward the disengaged position, the projection 132 must first be moved out of the groove 130, but the movement of the projection 132 out of the groove 130 is resisted by the biasing force applied to the projection 132 by the leaf spring 134 when the projection 132 is moved away even slightly from its resting position in groove 130. Accordingly, the engagement of the projection 132 with the groove 130 provides resistance to the movement of the clip 104 out of the engaged position and toward the disengaged position, and thus maintains the clip 104 in the engaged position until sufficient torque is applied to the clip 104 to overcome the biasing force applied to the projection 132 and move the clip 104 toward the disengaged position.

Figure 8:
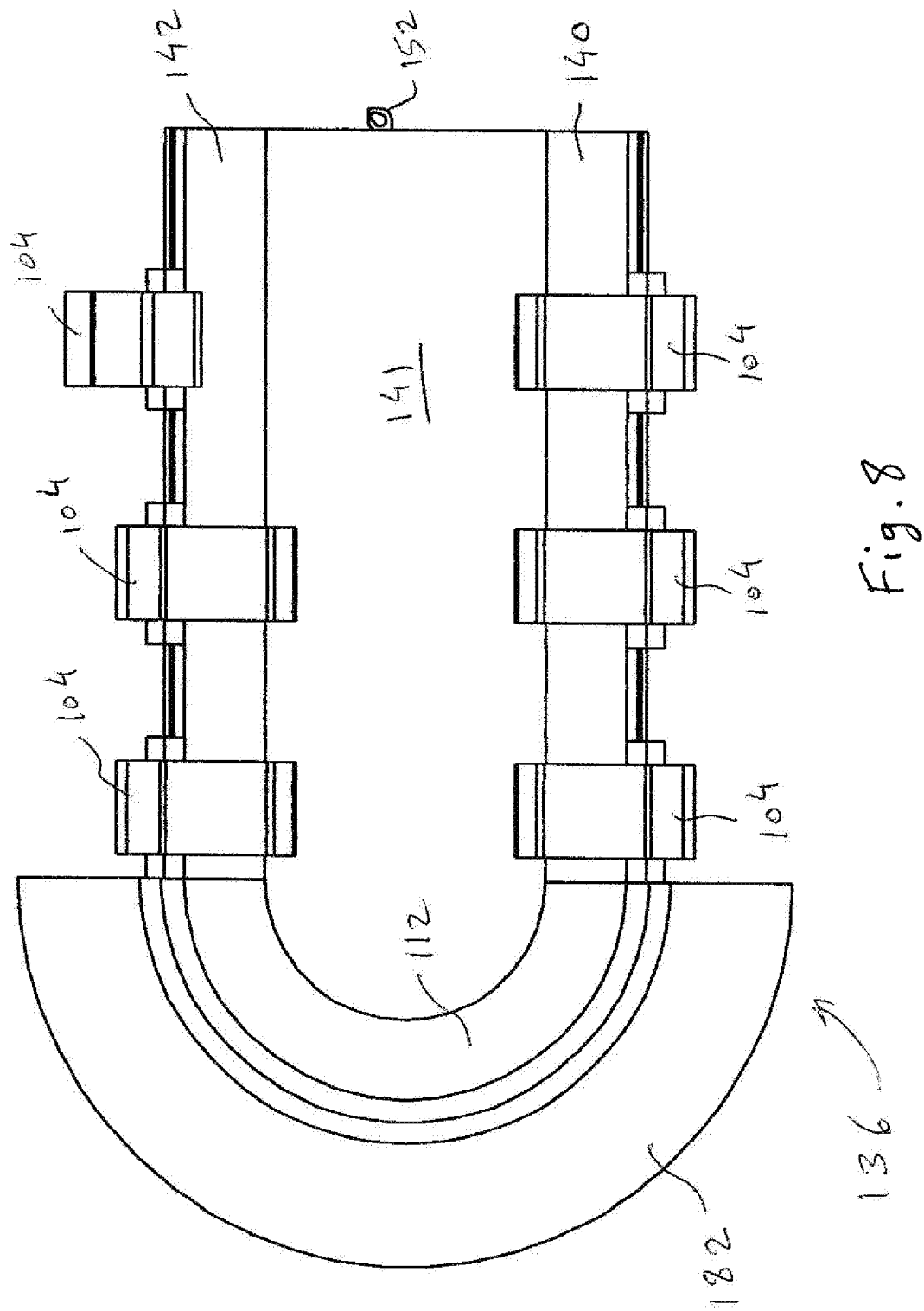
Figure 9:
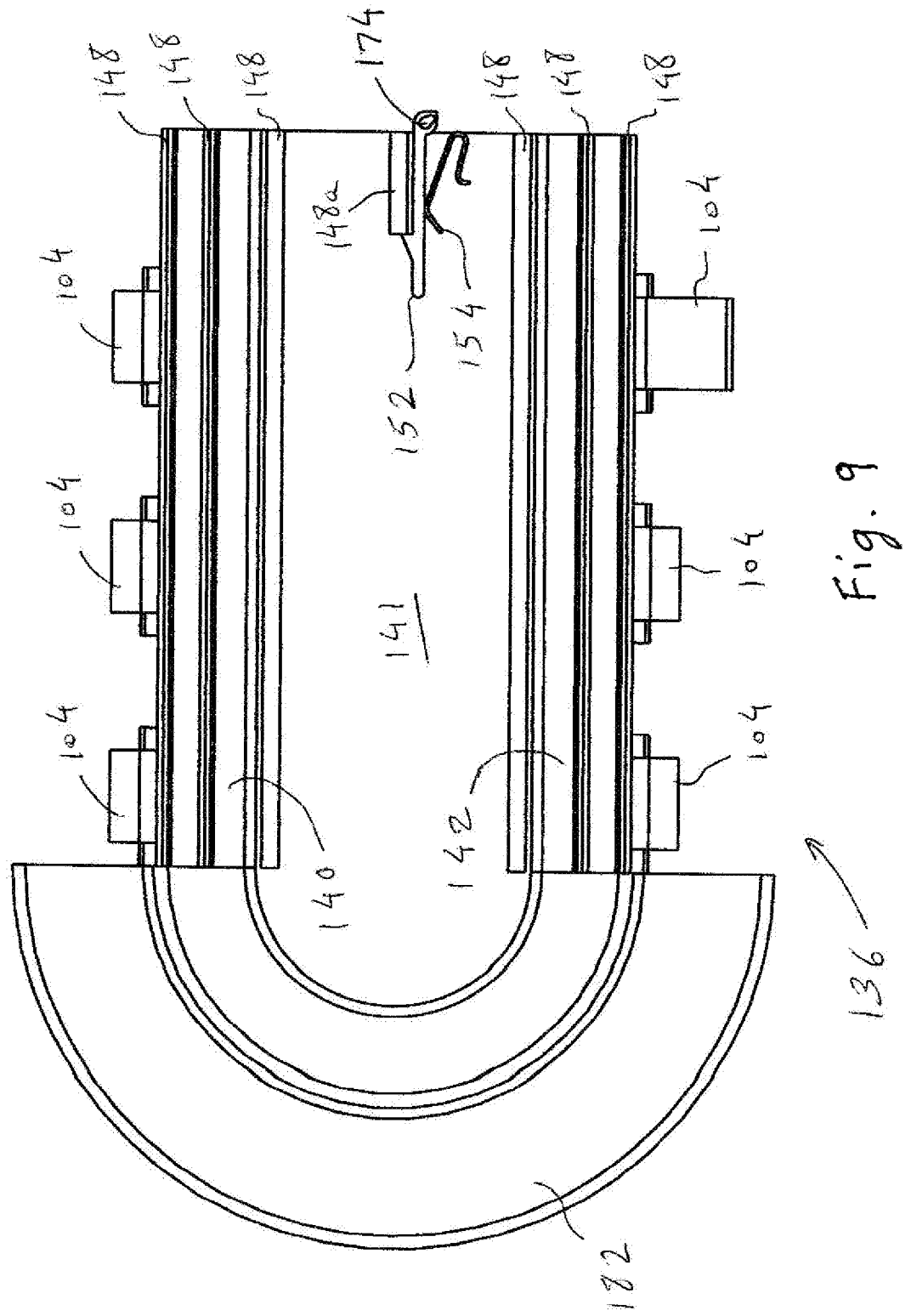
Figure 10:
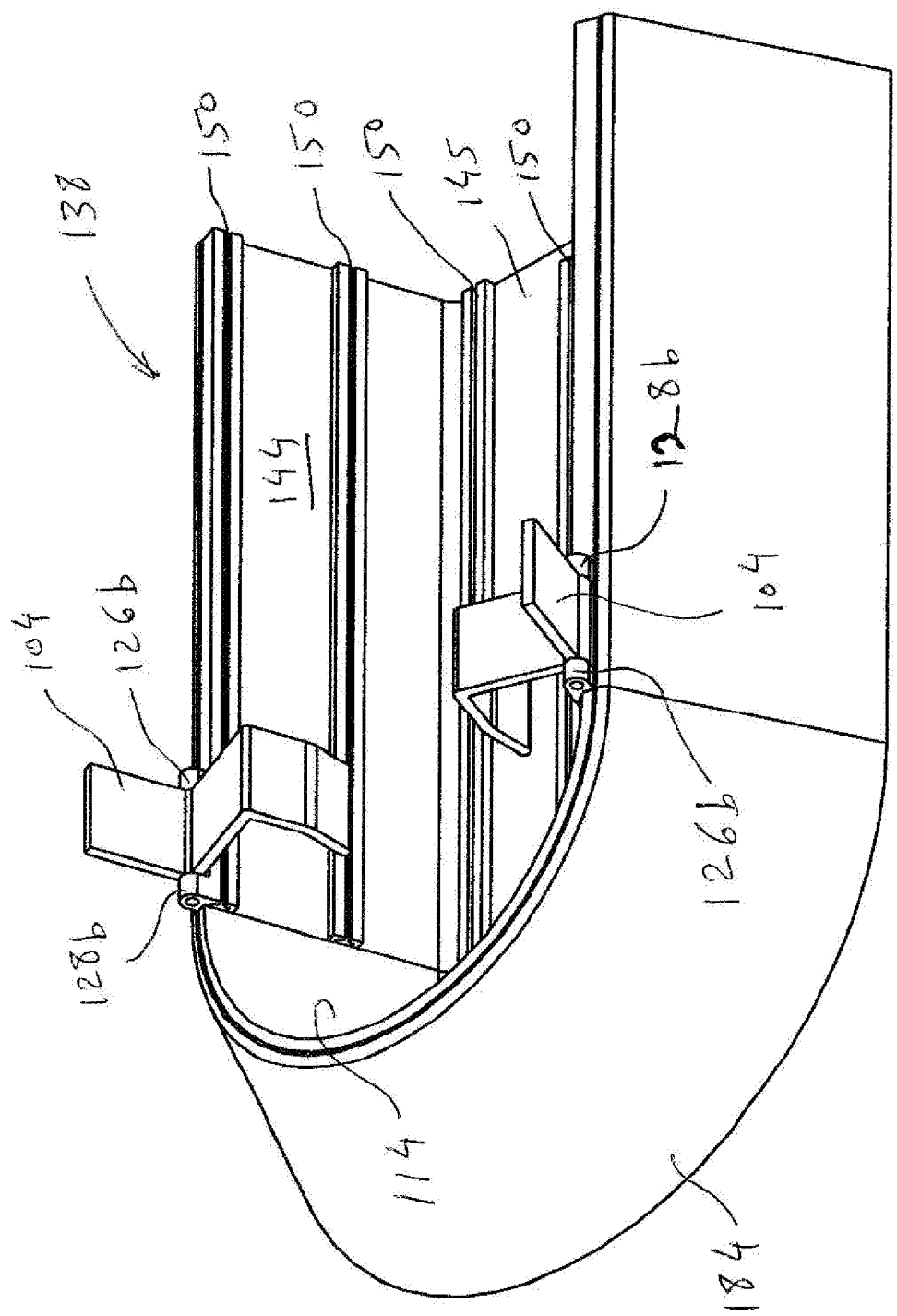
FIGS. 10-15 are views of the outer half of the bread support of an embodiment of the Sandwich Making Utensil.
Figure 11:
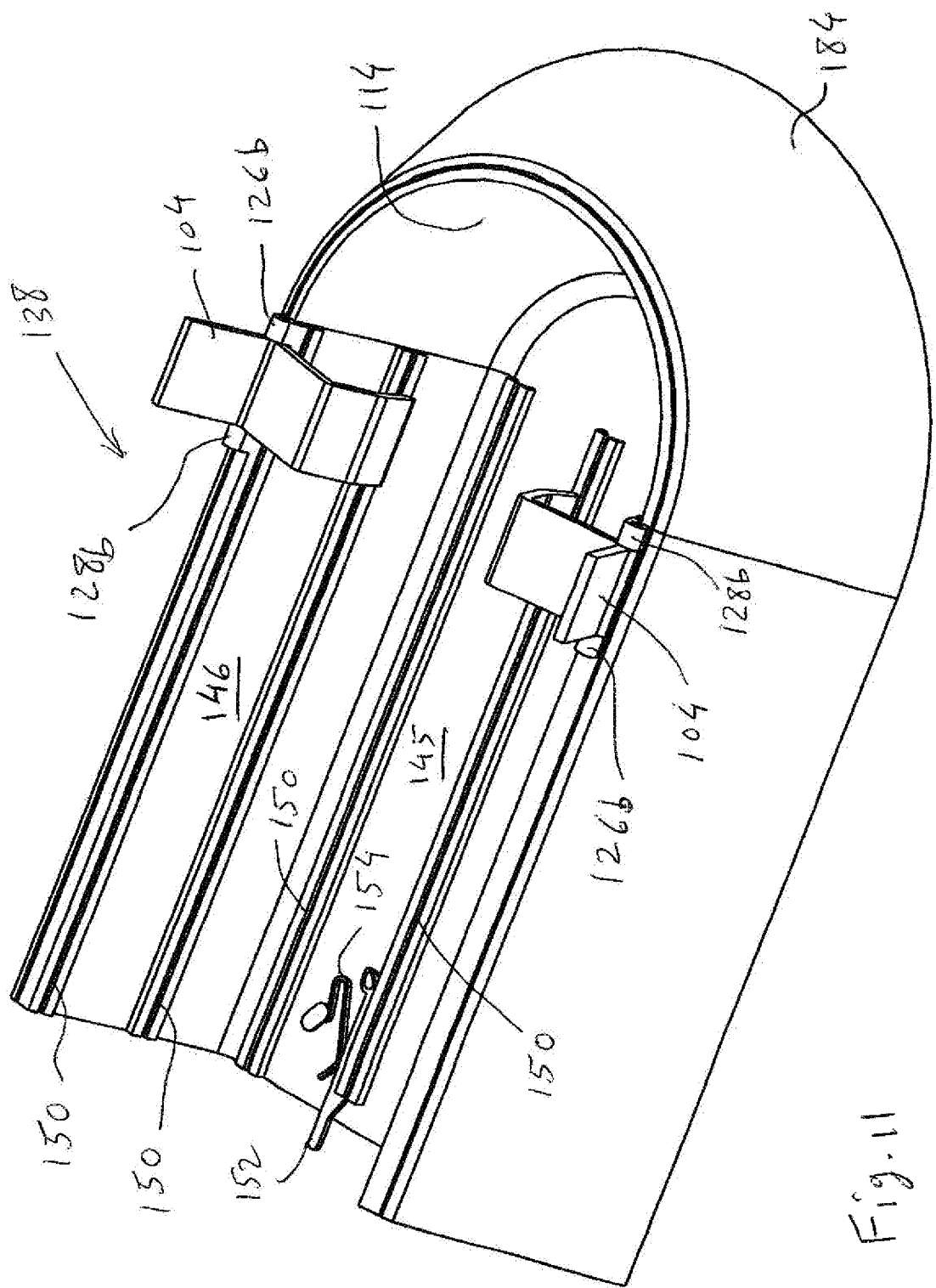
Figure 12:
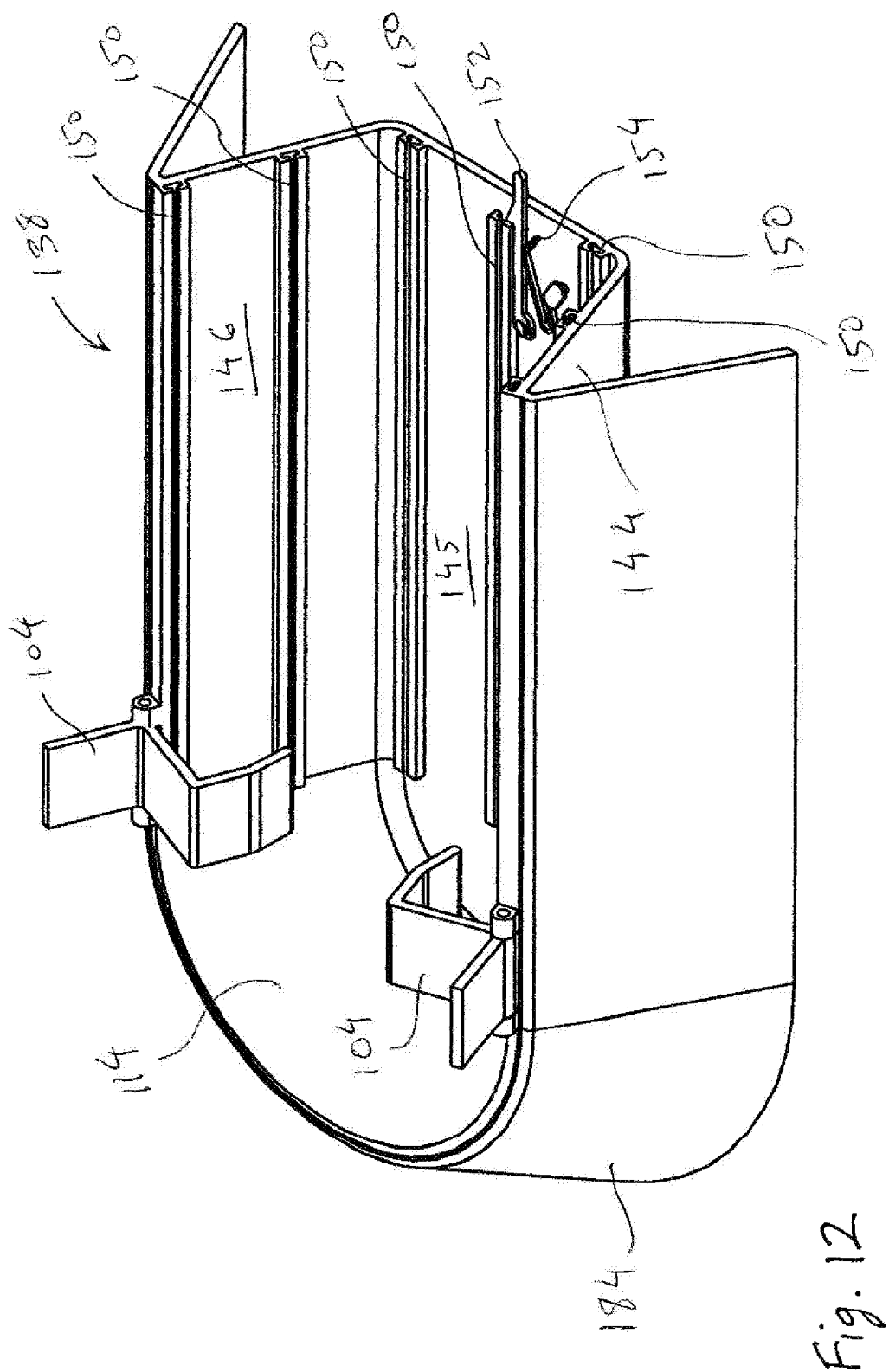
Figure 13:
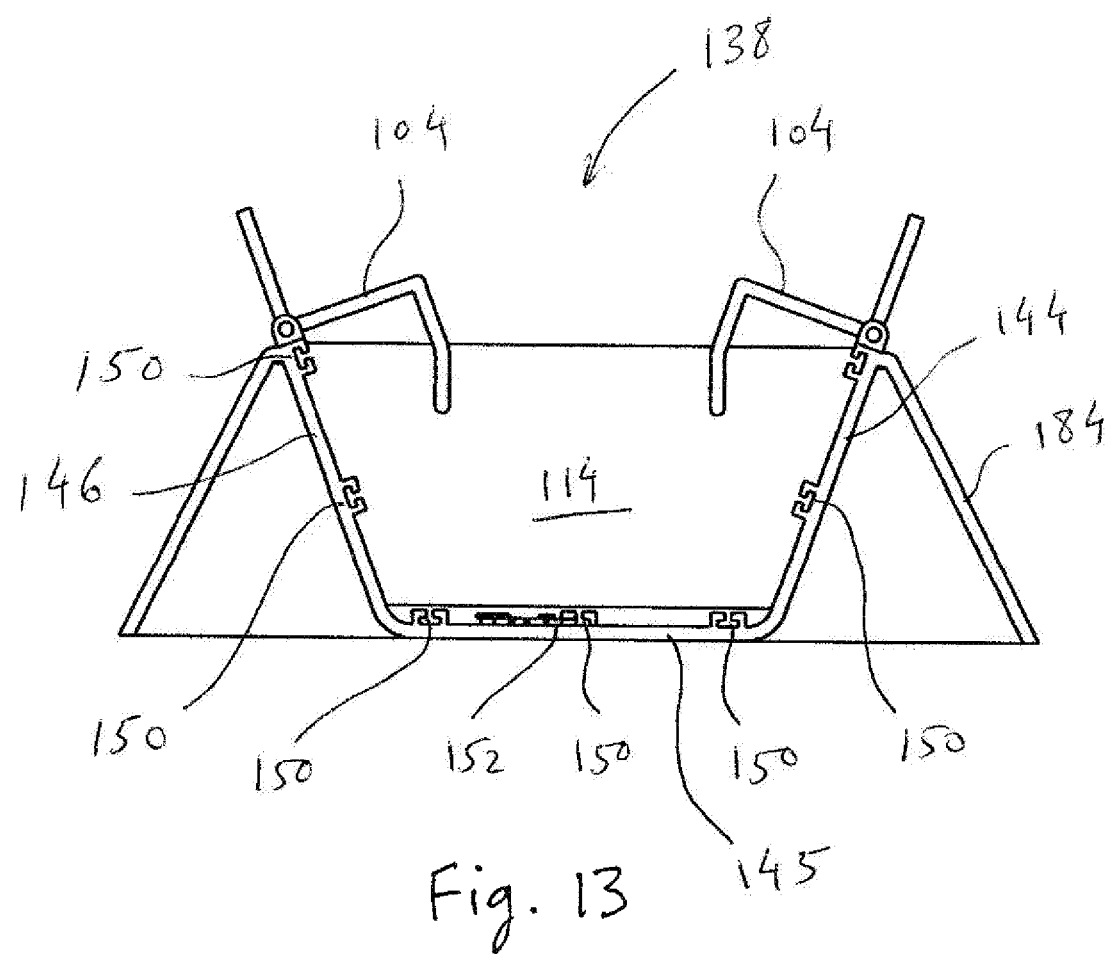
Figure 14:
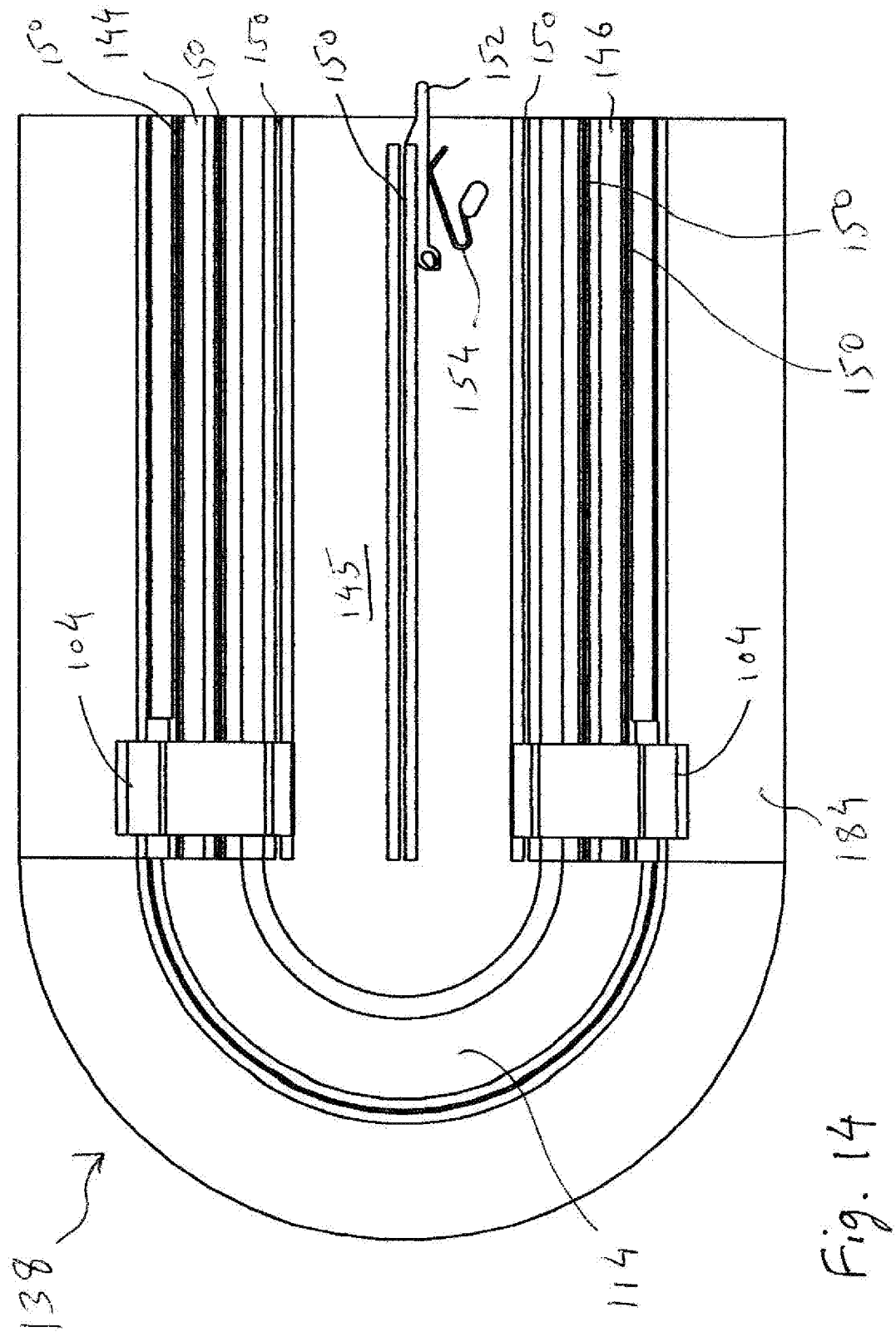
Figure 15:
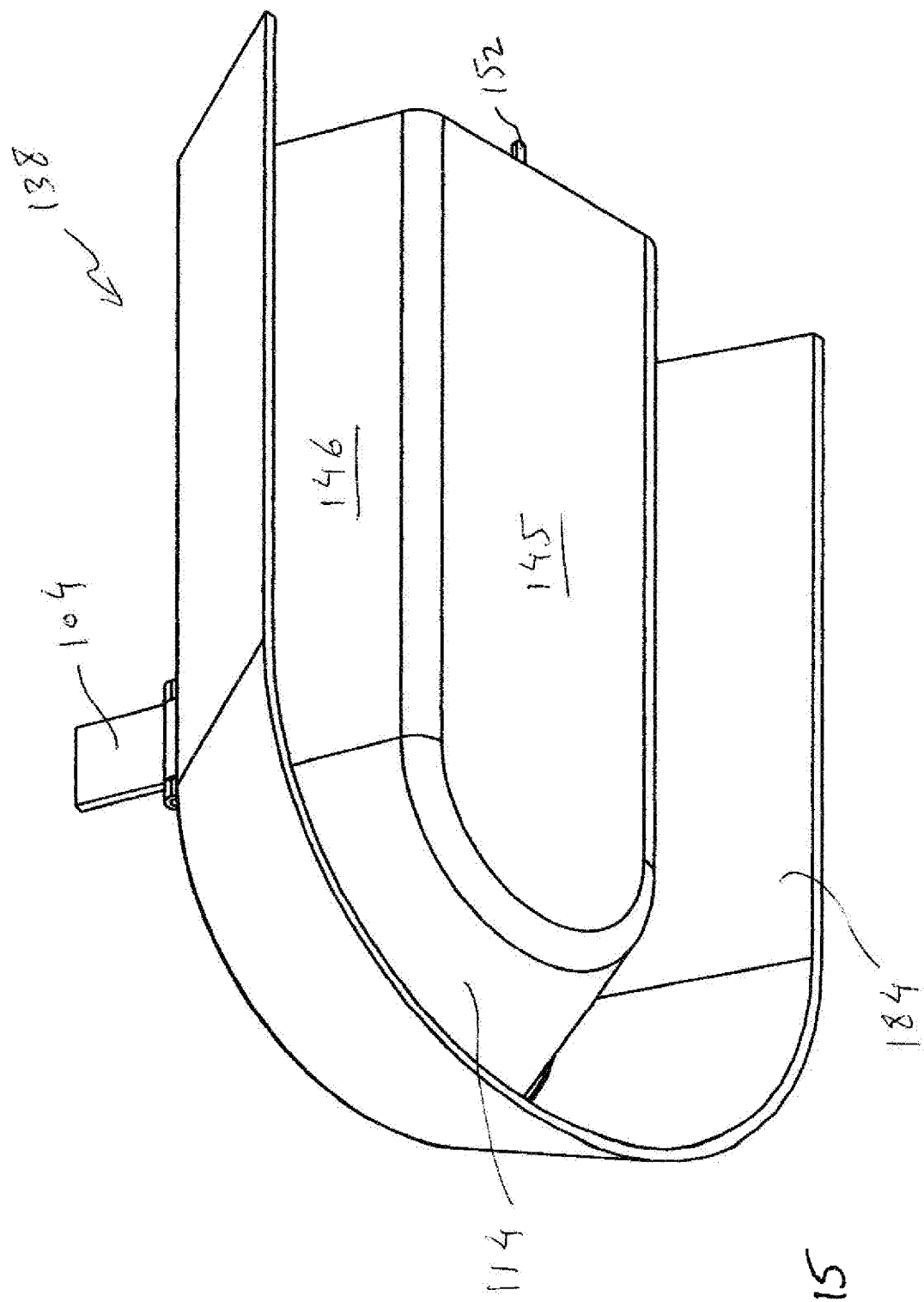
Figure 16:
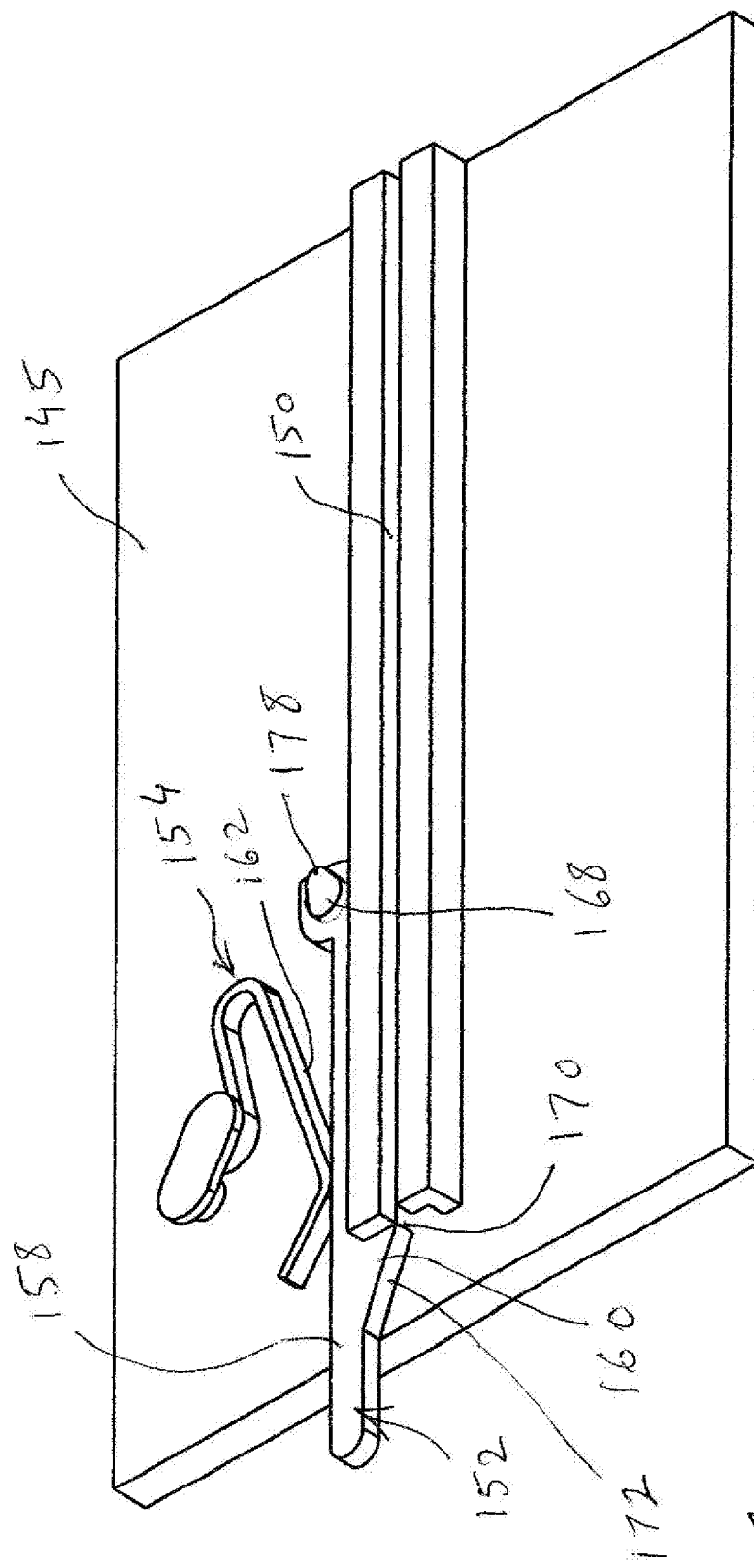
FIGS. 16-22 are fragmentary views showing details of the catch for selectively holding together the inner and outer halves of the bread support of an embodiment of the Sandwich Making Utensil.
Figure 17:
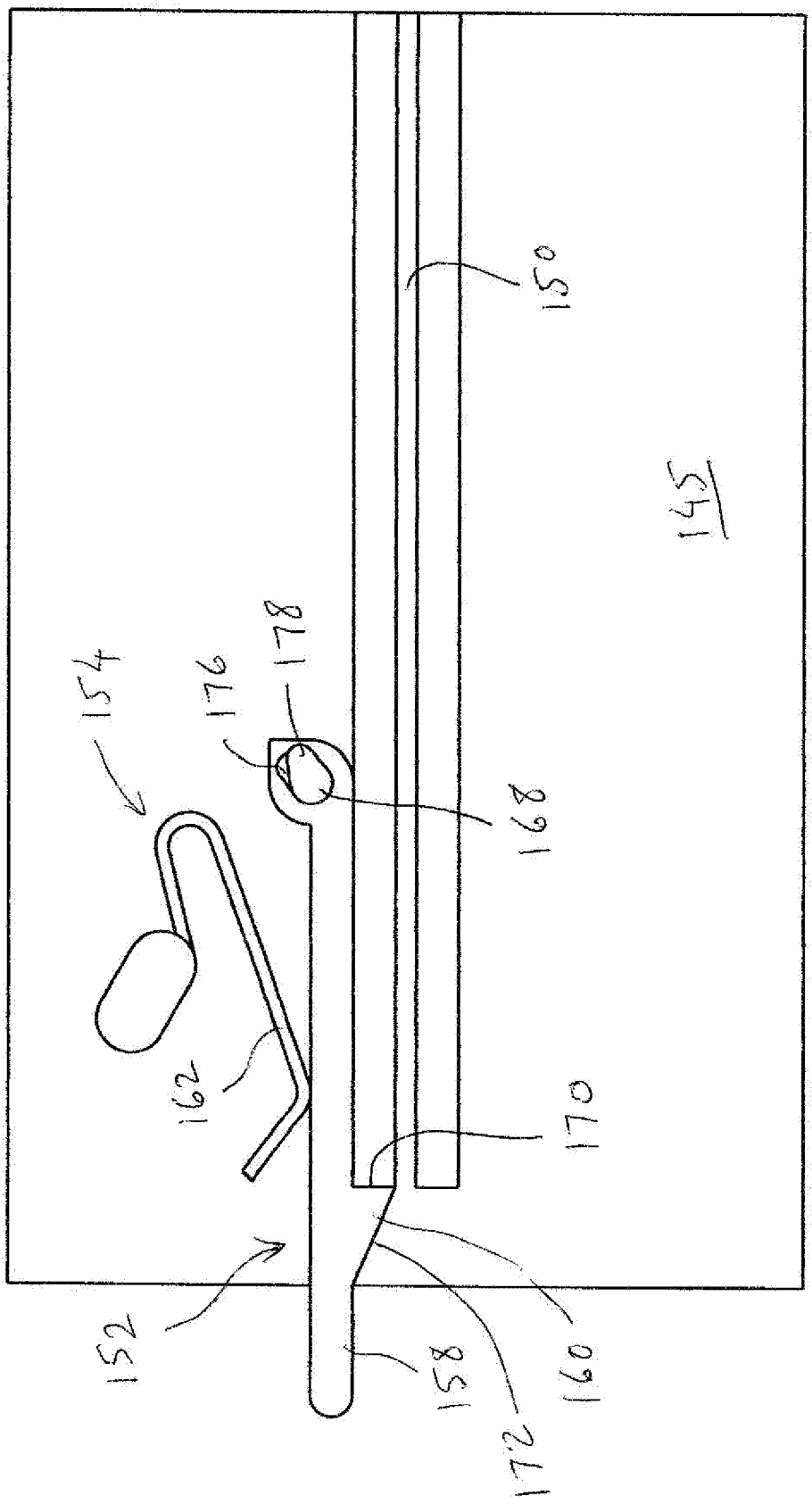
Figure 18:
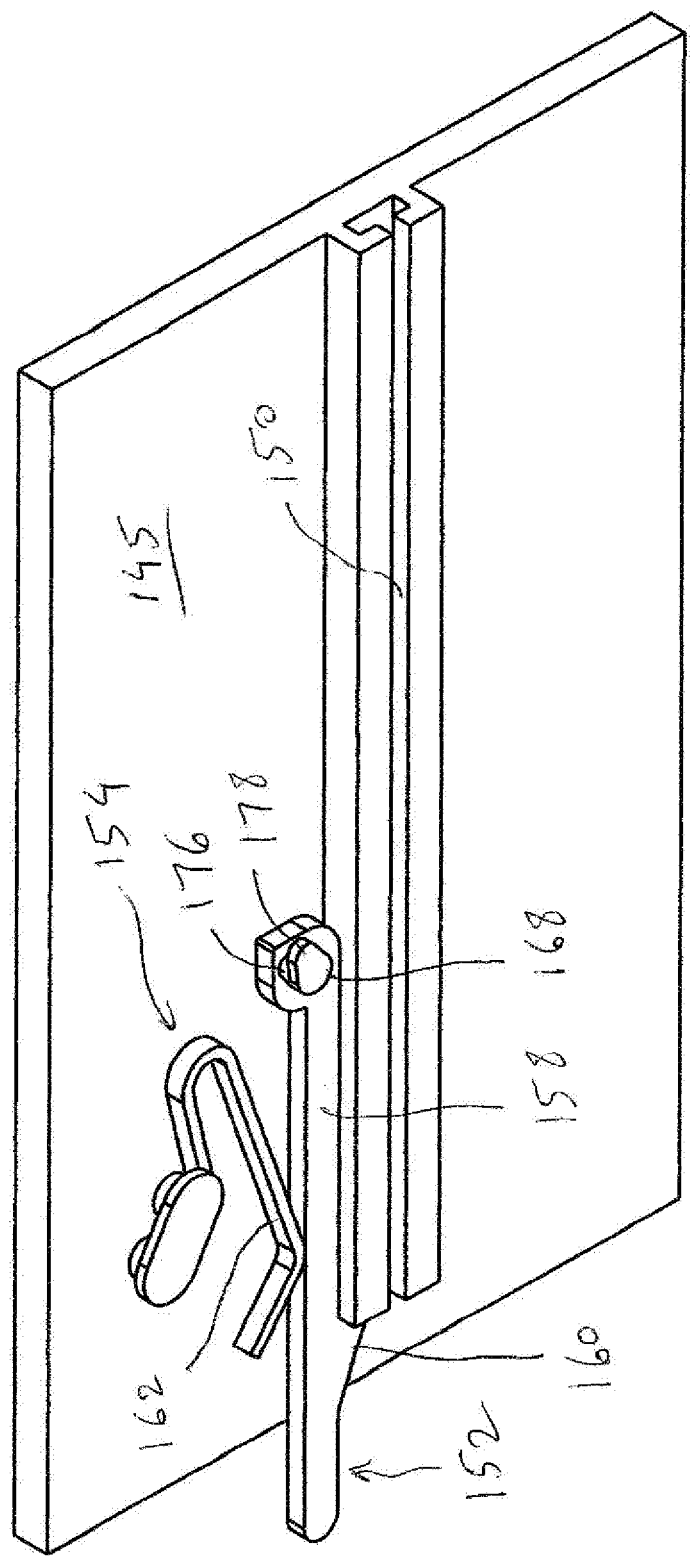
Figure 19:
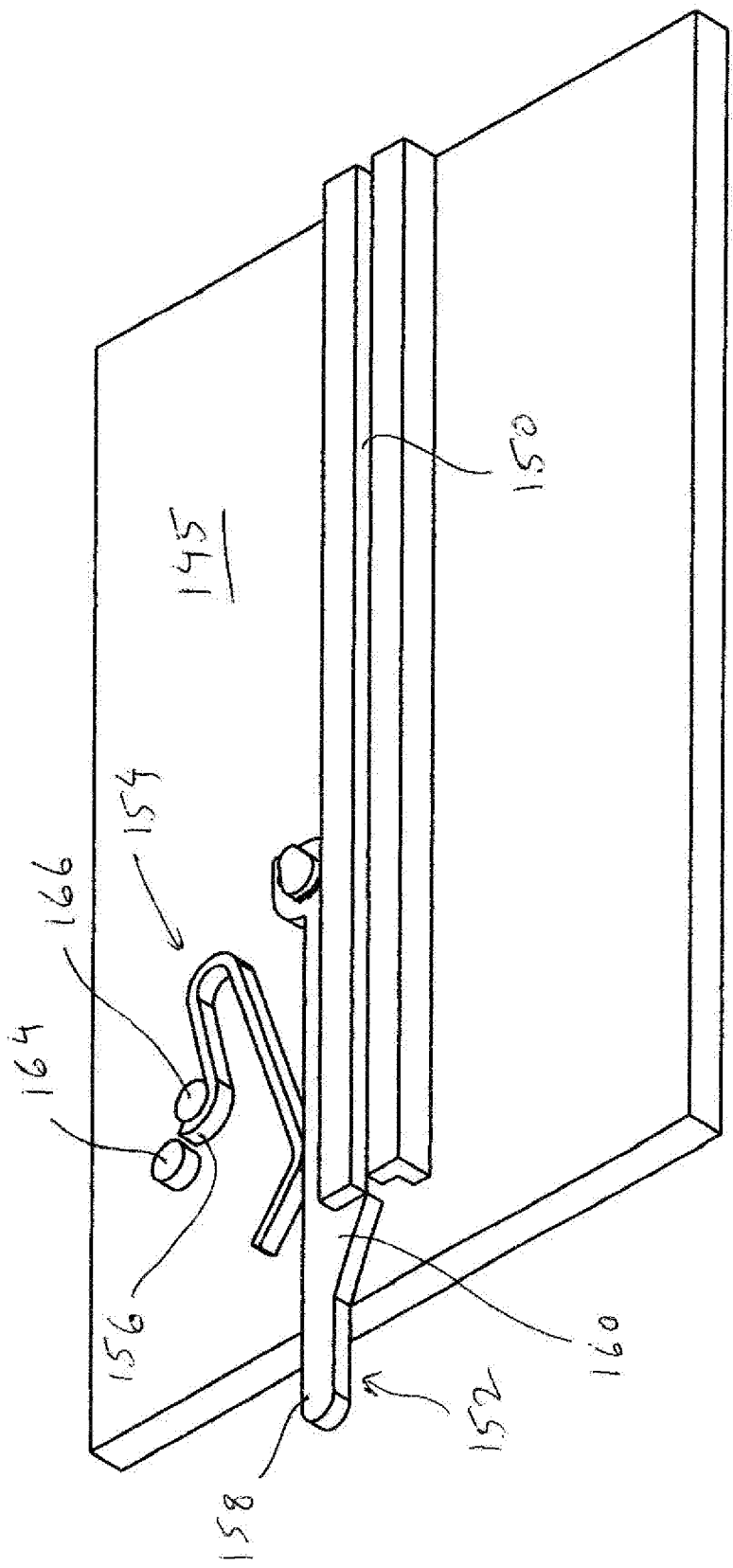
Figure 20:
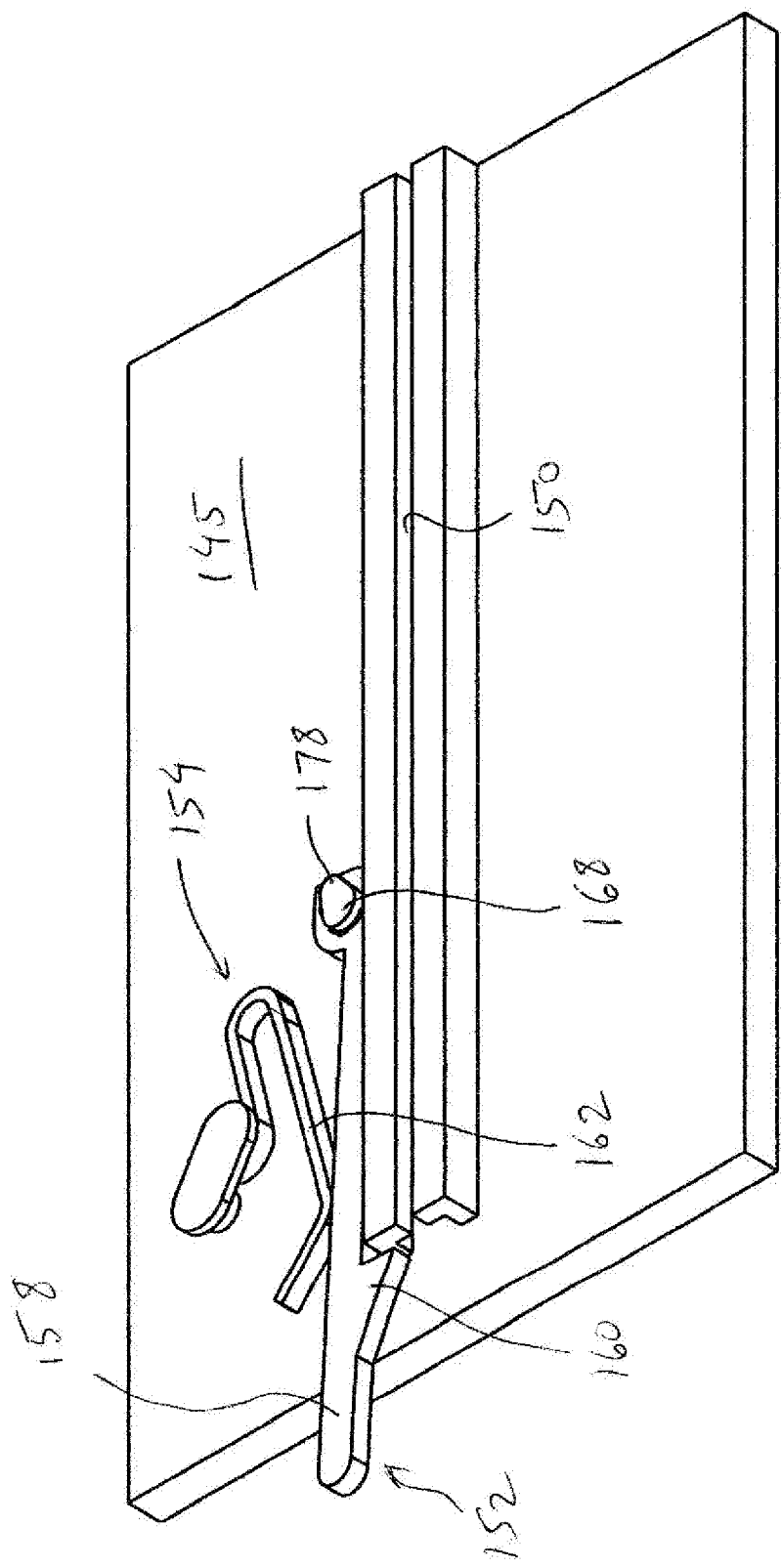
Figure 21:
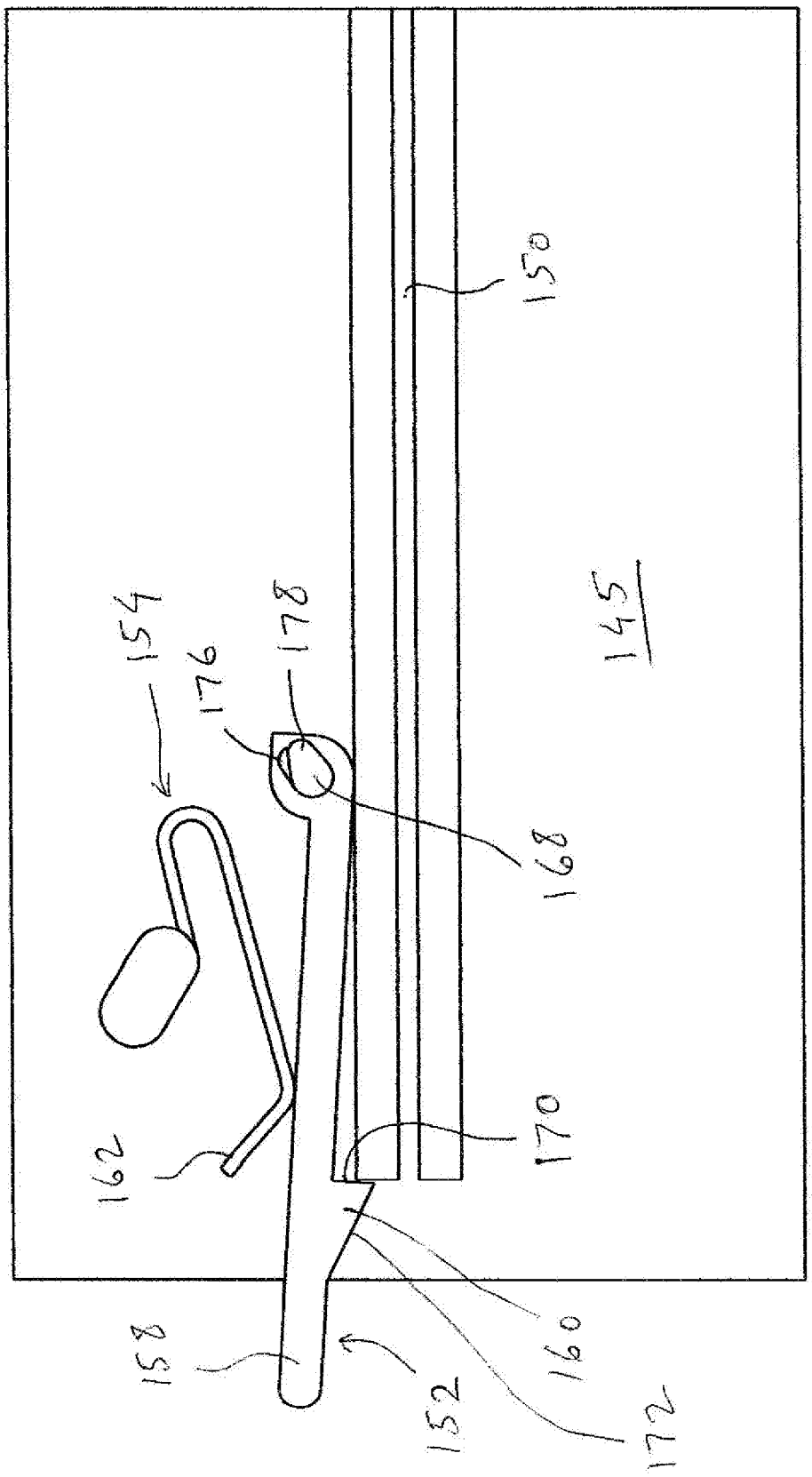
Figure 22:
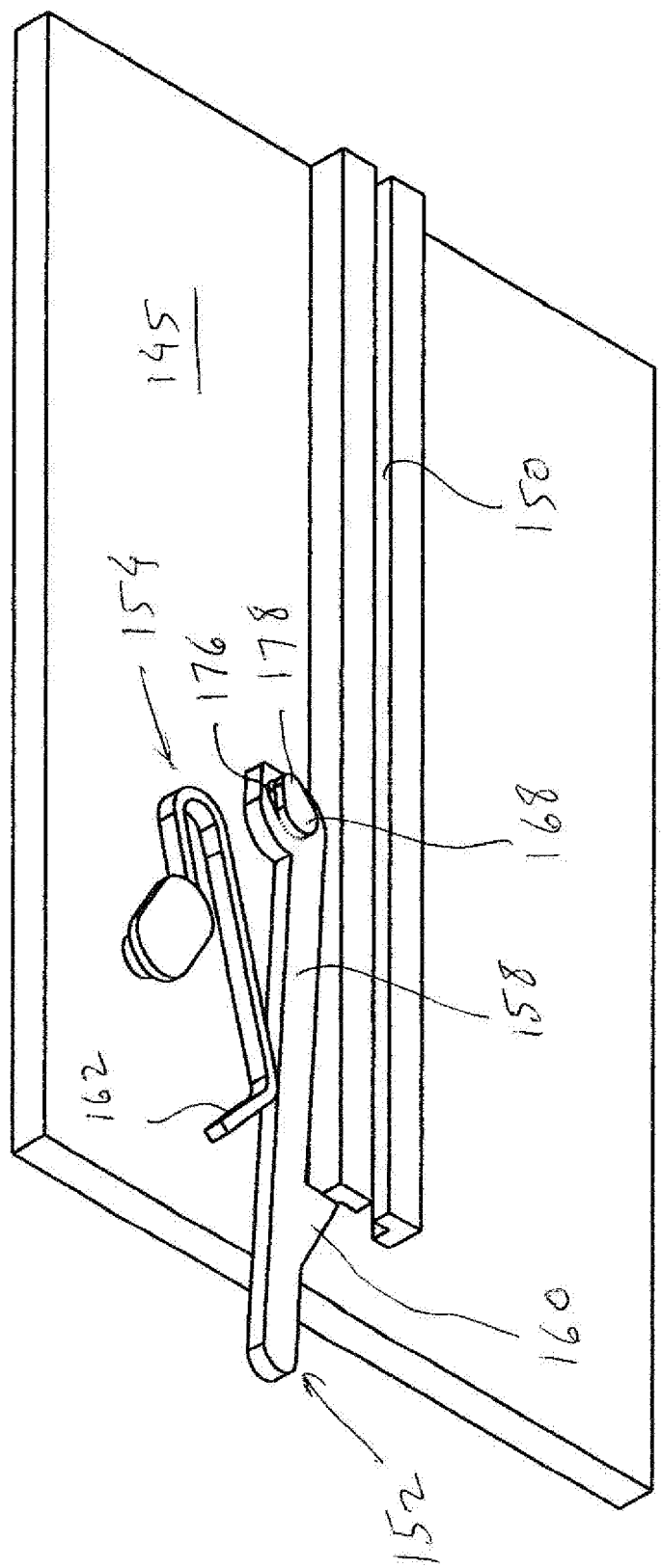
Figure 23:
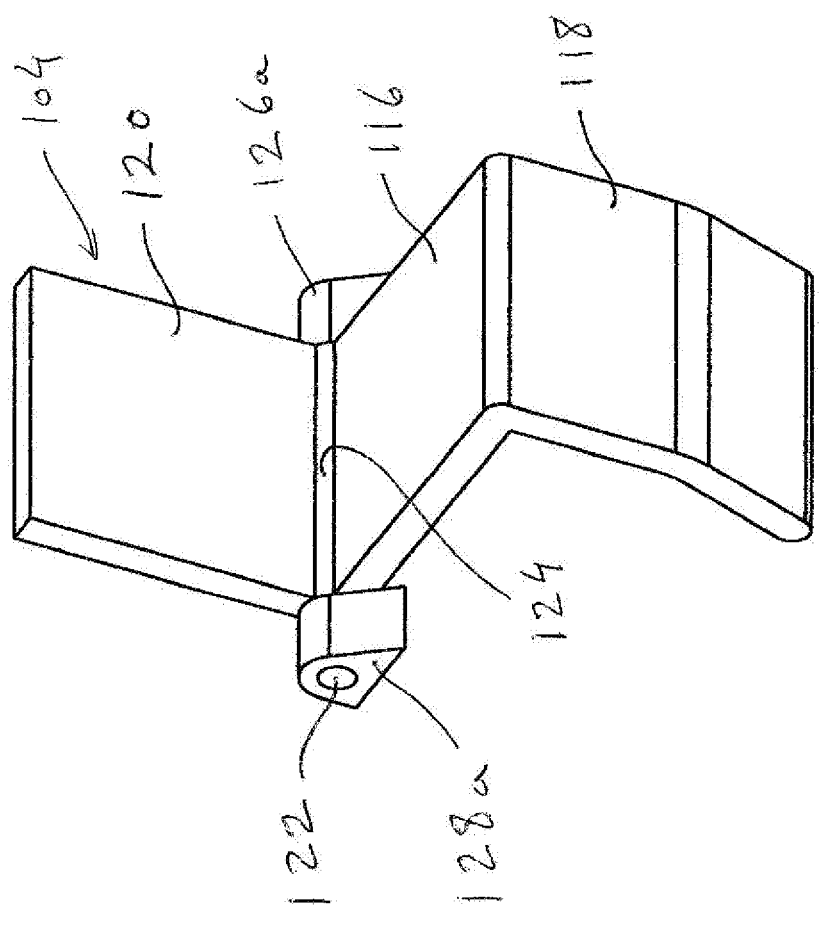
Figure 24:
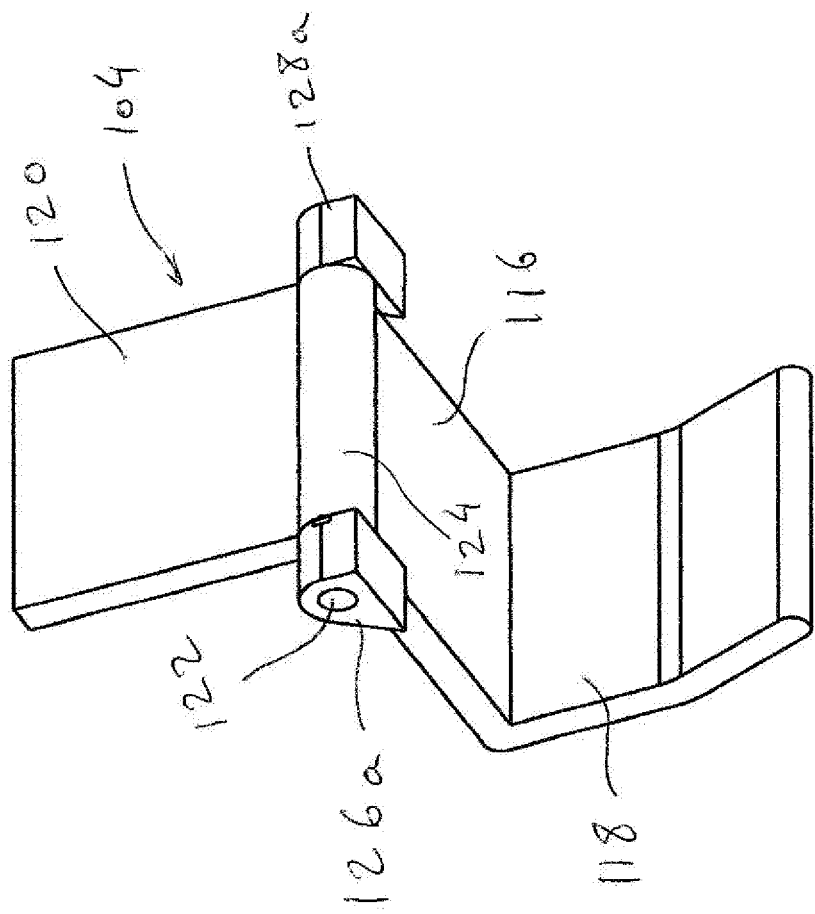
Figure 25:
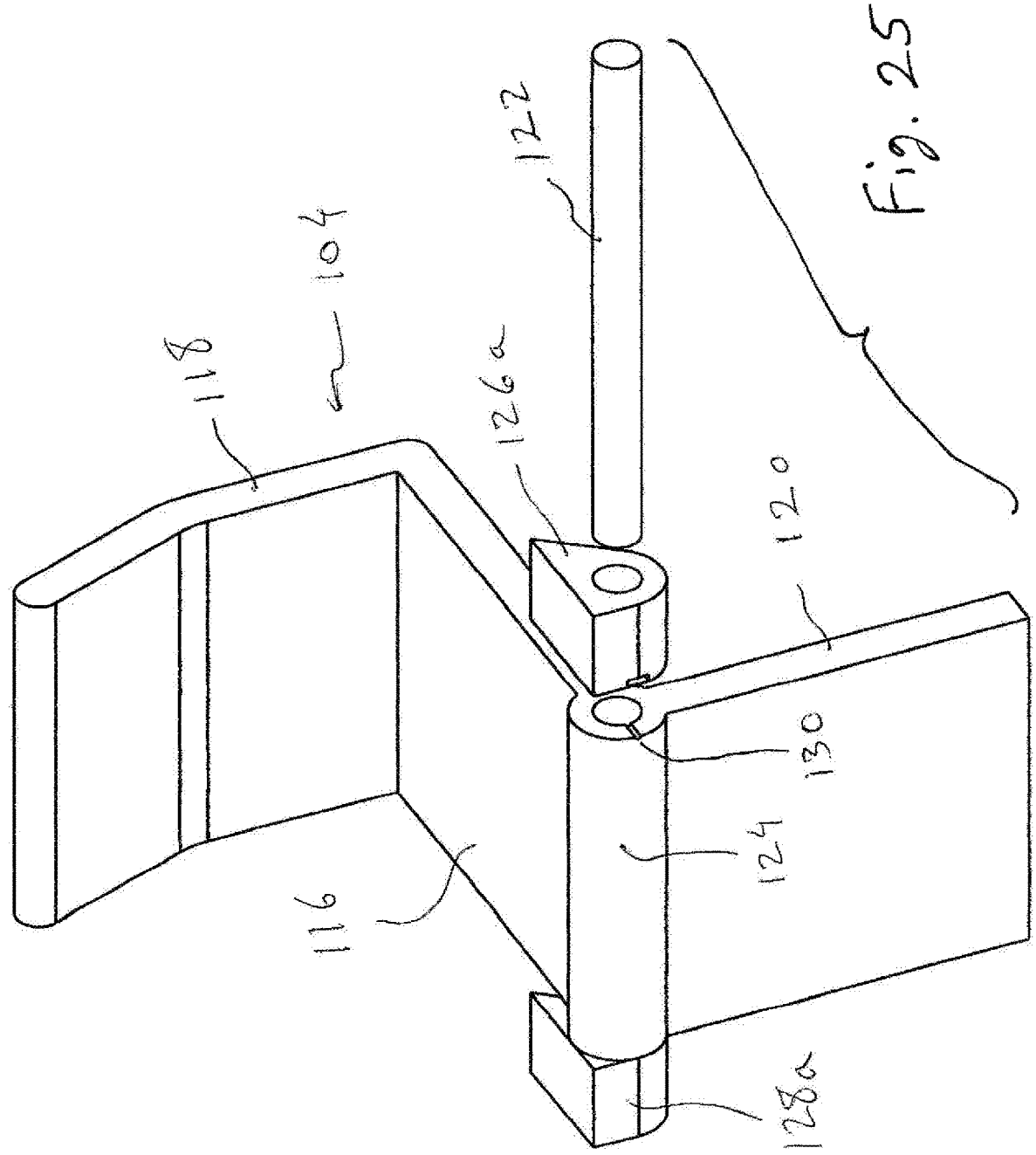
Figure 26:
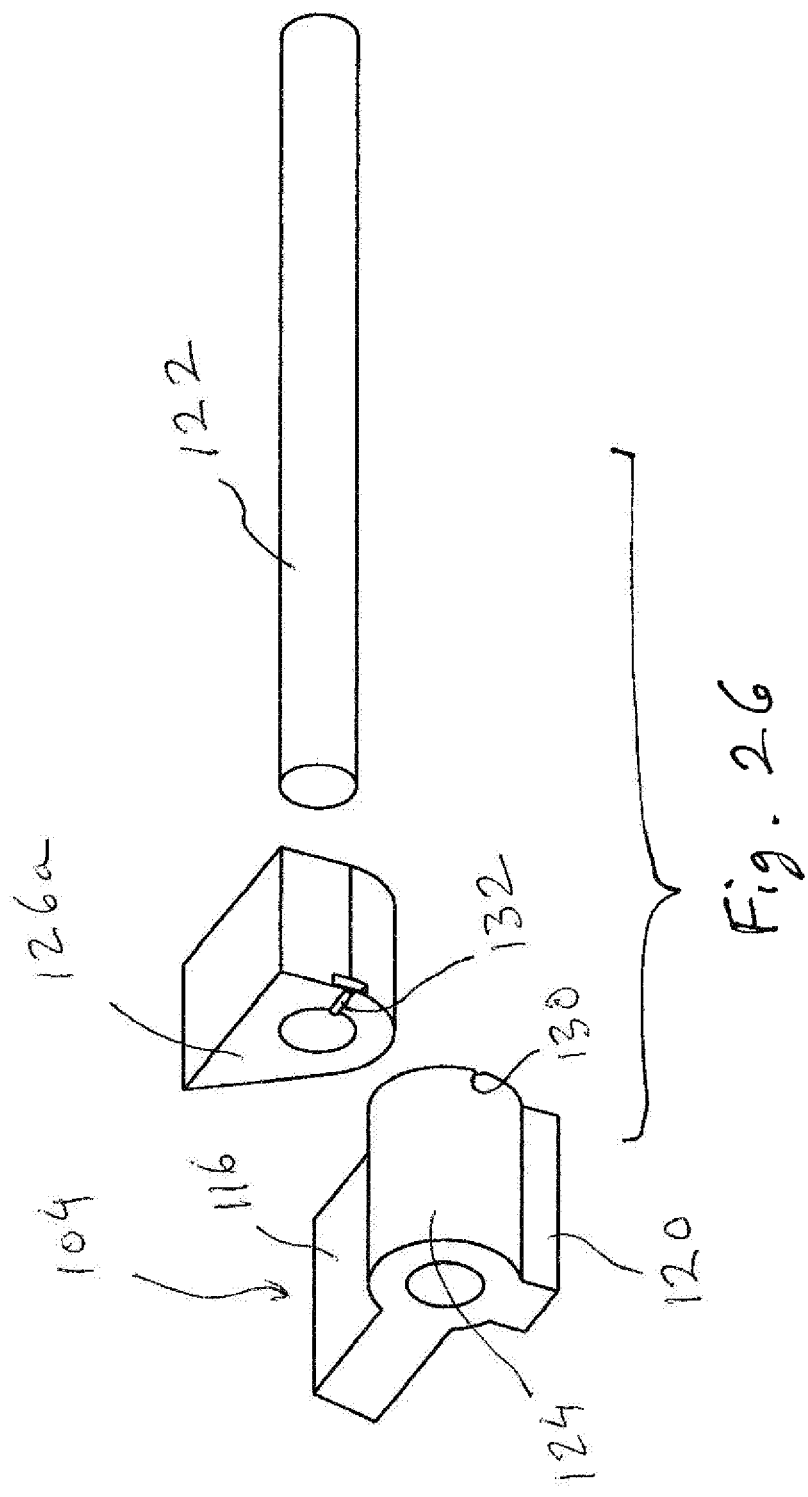
Figure 27:
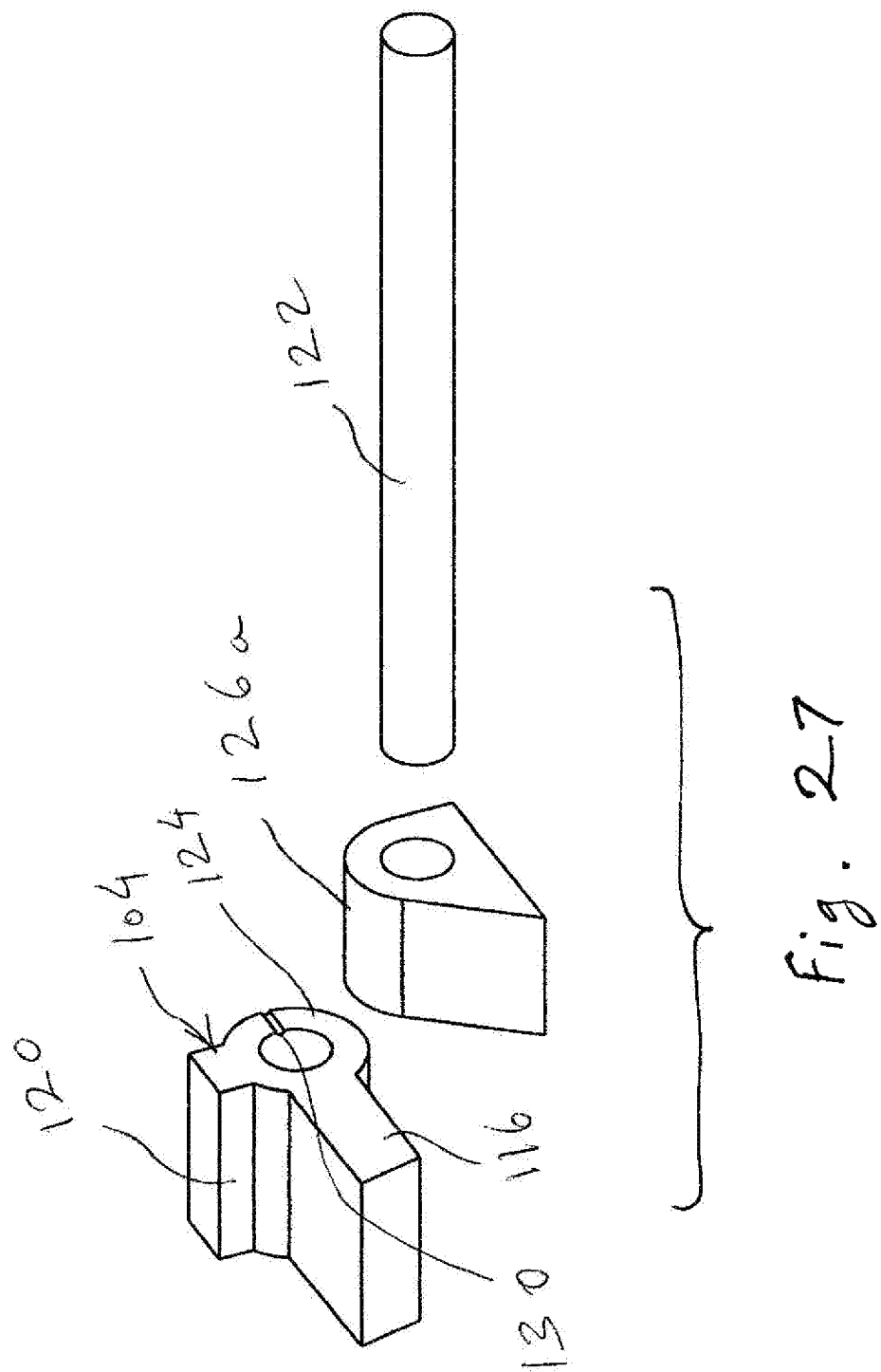
Figure 28:
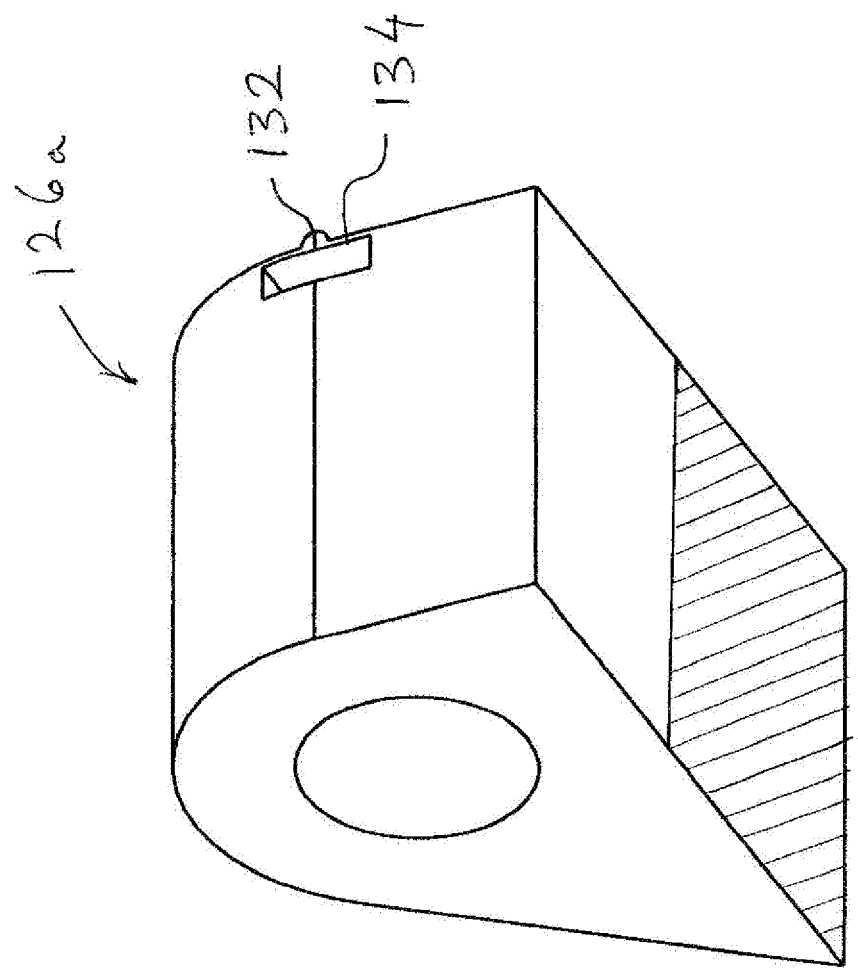
Figure 29:
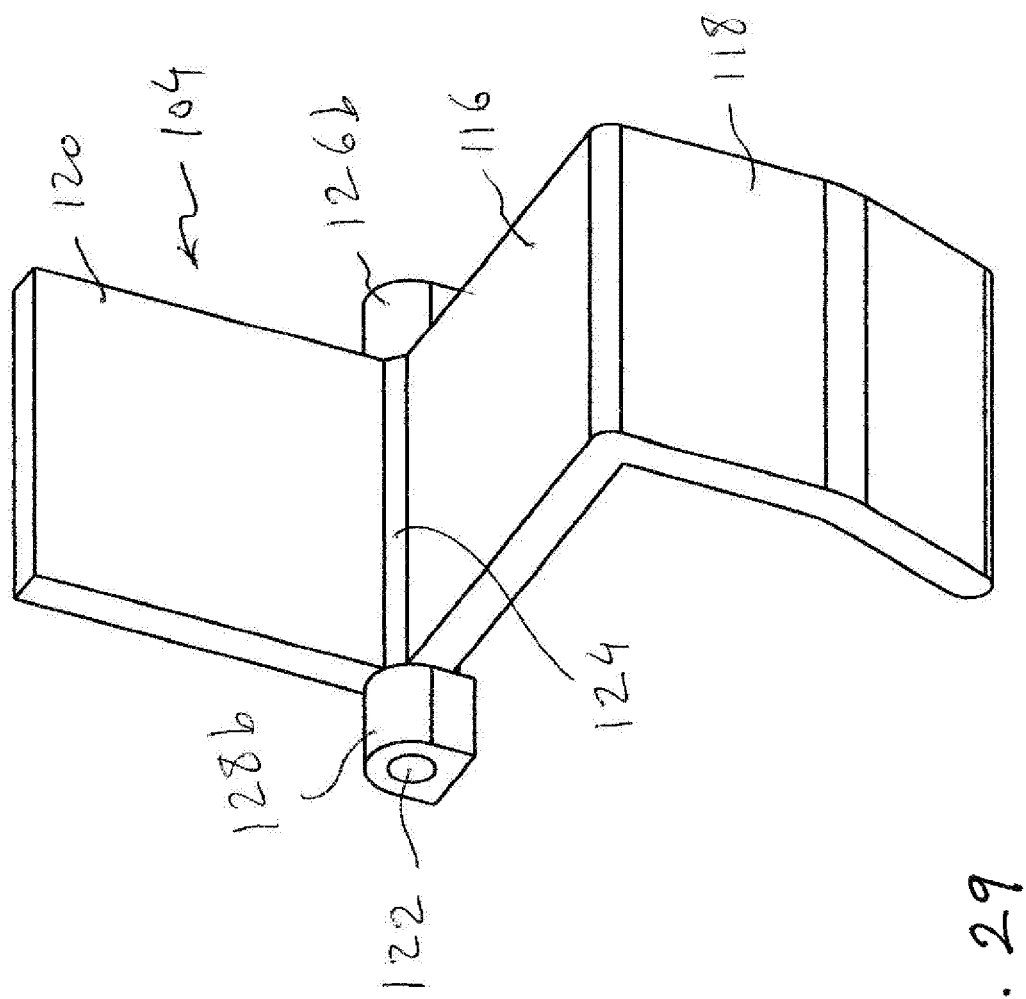
Figure 30:
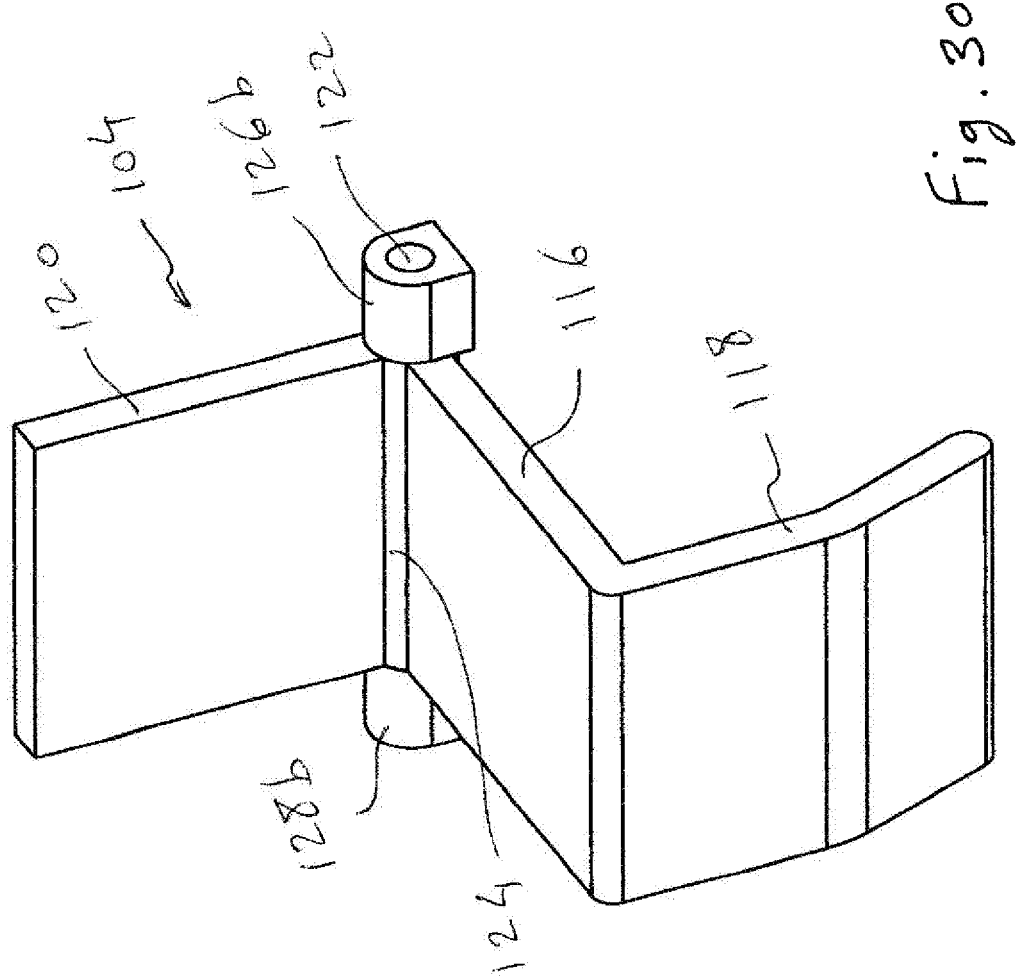
Figure 31:
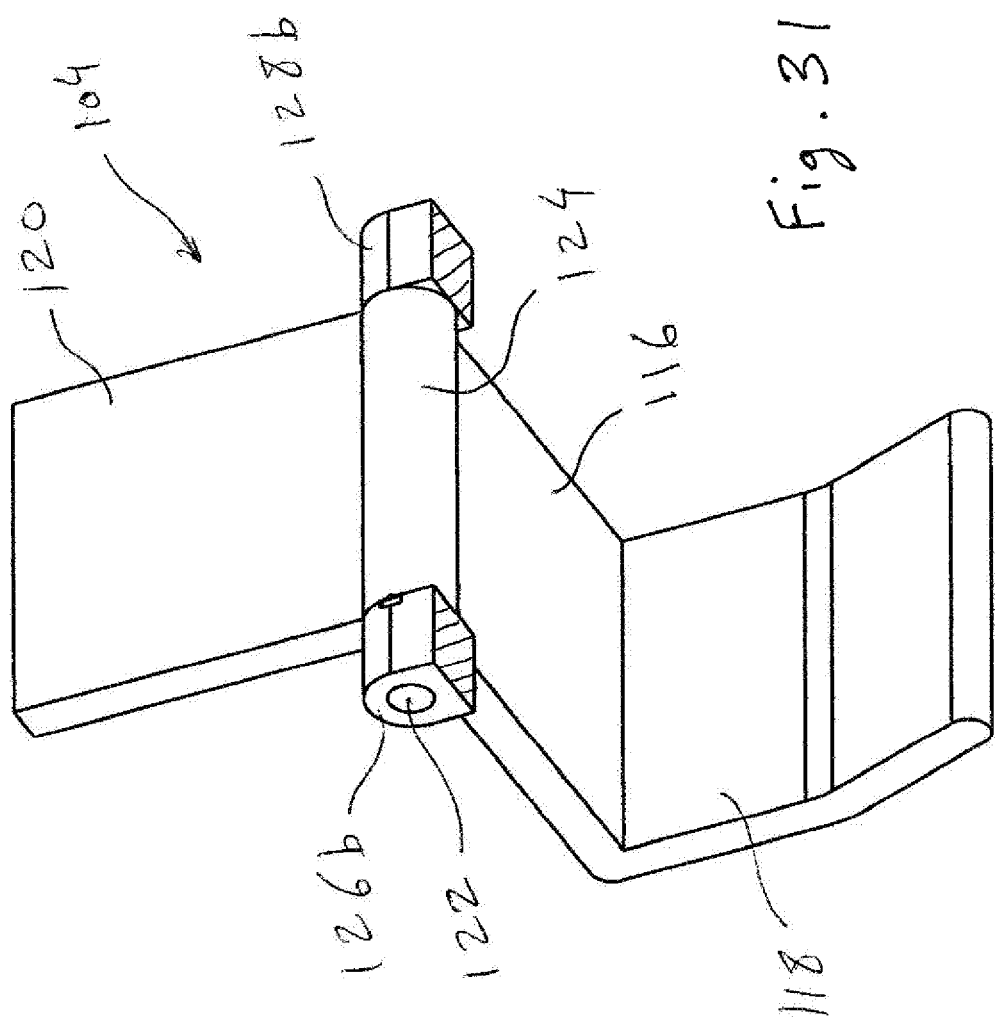
Figure 32:
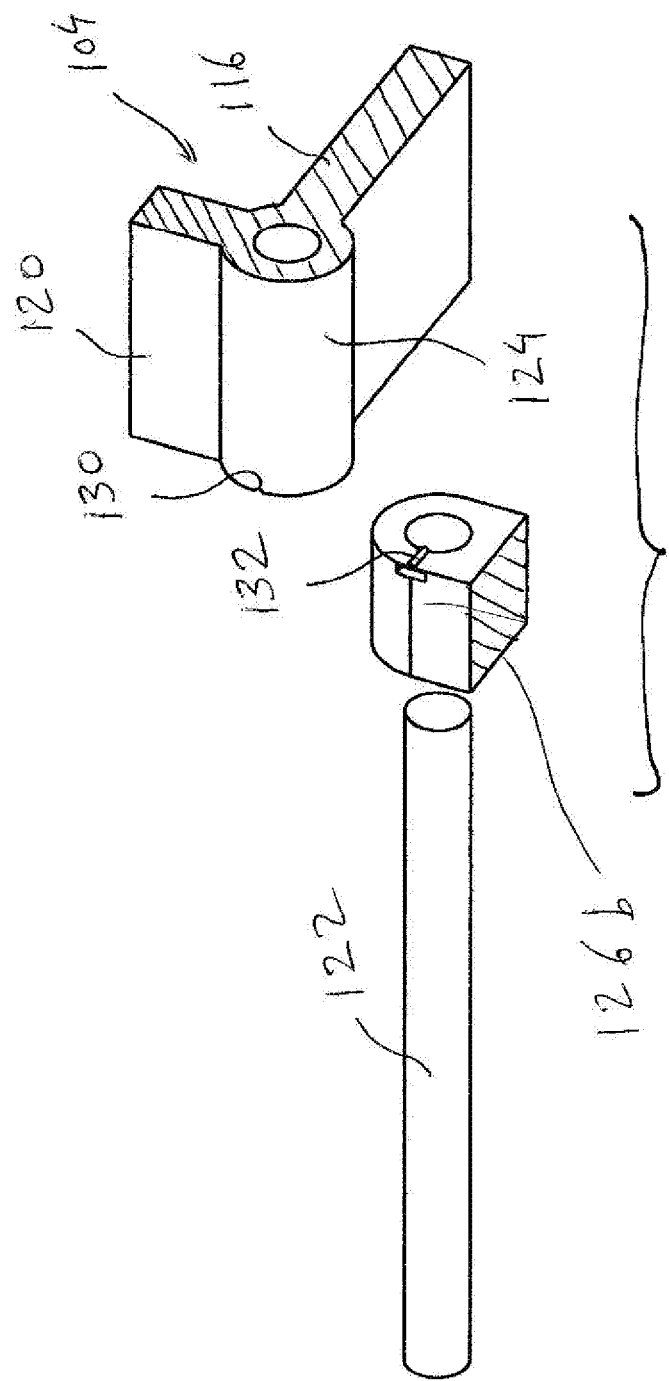
Figure 33:
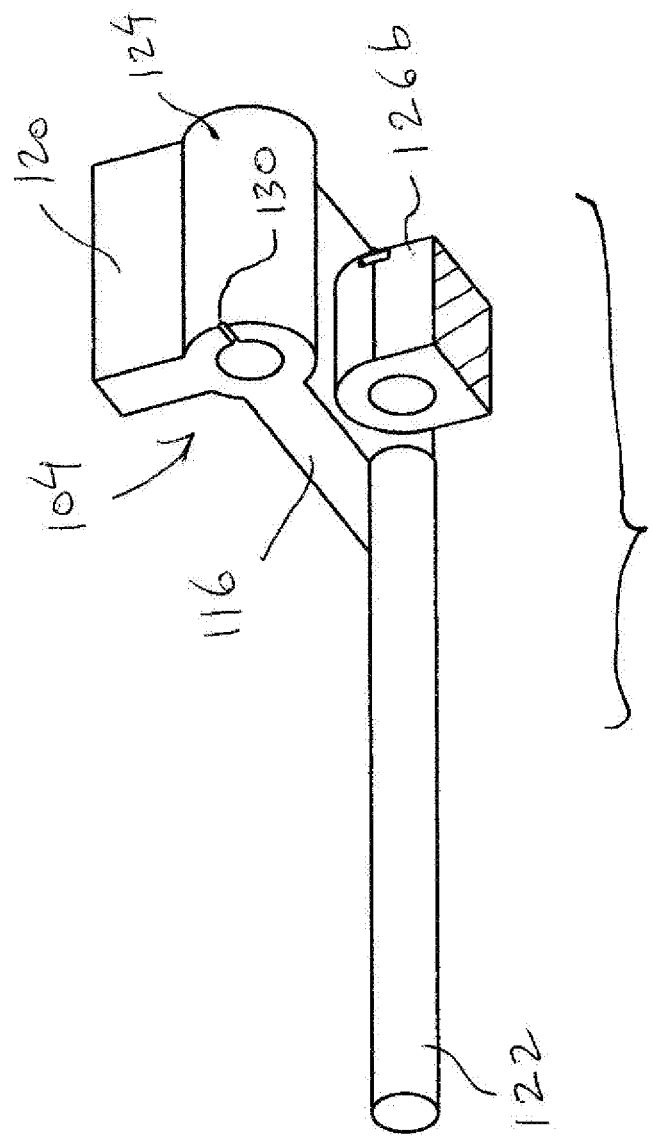

As is readily apparent from FIGS. 8 and 13 by inspection, it can be seen that each pair of opposing blocking members 118 are closest together when they are in the engaged position and they are farther apart when even one of the opposing blocking members 118 is moved to its disengaged position. Accordingly, each pair of opposing blocking members 118 are farther apart when the opposing blocking members 118 are moved to their disengaged positions. Given that the operating levers 120 are used to more easily move the clips 104, and in turn the blocking members 118, between the engaged and disengaged positions, it is readily apparent that the clips 104, and in turn the blocking members 118, tend to remain in their disengaged positions until they are manually moved toward their engaged positions.

In the illustrated embodiment, the projection 132 and the leaf spring 134 are integral with a respective projection or boss 126a, 128a, 126b, or 128b; however, the detent function could alternatively have been provided by a ball bearing biased by a coil spring housed in a channel in the respective boss 126a, 128a, 126b, or 128b or by another known detent mechanism. In the illustrated embodiment, the bosses 126a and 128a are attached to the inner part 136 of the bread support 102, and the bosses 126b and 128b are attached to the outer part 138 of the bread support 102. In the illustrated embodiment, each of the projections 132 and each of the leaf springs 134 is provided on or as part of a corresponding projection or boss 126a or 126b.

In the illustrated embodiment, the bread support 102 is in at least two parts including an inner part 136 and an outer part 138. The inner part 136 has an end wall 112, which also forms one of the end walls of the bread support 102, and sidewalls 140 and 142. The outer part 138 has an end wall 114, which also forms the other end wall of the bread support 102, and sidewalls 144 and 146. The sidewall 140 of the inner part 136 and the sidewall 144 of the outer part 138 cooperatively form the sidewall 108 of the bread support 102, and the sidewall 142 of the inner part 136 and the sidewall 146 of the outer part 138 cooperatively form the sidewall 110 of the bread support 102. The bottom 141 of the inner part 136 and the bottom 145 of the outer part 138 cooperatively form the bottom 106 of the bread support 102. The inner part 136 and outer part 138 are capable of sliding movement relative to each other to provide for extension and retraction of the bread support 102. Thus, the bread support 102 can telescopically extend and retract.

The sandwich making utensil 100 further includes interengaging ribs 148 and slots 150, which allow for the sliding movement between the inner part 136 and the outer part 138. The sliding movement between the inner part 136 and the outer part 138 is limited to translation along the longitudinal axis of the bread support 102. The ribs 148 are provided on one of the inner part 136 and the outer part 138 and the slots 150 are provided on the other one of the inner part 136 and the outer part 138.

Each of the slots 150 is dimensioned and configured to receive at least a portion of a respective one of the ribs 148 for sliding movement in the slot 150. When the inner part 136 and the outer part 138 are assembled together, each of the slots 150 receives at least a portion of a respective one of the ribs 148 for sliding movement in the slot 150.

In the illustrated embodiment, the ribs 148 have a T-shaped cross section and the slots 150 also have a T-shaped cross section such that each of the slots 150 is capable of receiving at least a portion of a respective one of the ribs 148 for sliding movement within the slot. In the illustrated embodiment, the ribs 148 are provided on the inner part 136 and the slots 150 are provided on the outer part 138.

The sandwich making utensil 100 further includes a releasable catch mechanism that is capable of keeping the inner part 136 and the outer part 138 from separating completely during normal operation, but the catch mechanism can be operated by a person to allow the inner part 136 to be separated from the outer part 138 for cleaning purposes. In the illustrated embodiment, the slots 150 are open ended so that the ribs or rails 148 can be pulled completely out of the slots 150 to separate the inner part 136 and the outer part 138. In the illustrated embodiment, one of the ribs 148a is shorter than the other ribs 148. A catch 152 is pivotally supported by the outer part 138. The catch 152 is attached to the outer part 138. The catch 152 is pivotally movable between a blocking position and a release position. When in the blocking position, the catch 152 engages the rib 148a at the open end of the corresponding slot 150 and prevents the rib 148a from being withdrawn from the corresponding slot 150. Thus, the catch 152 keeps the inner part 136 and the outer part 138 from being separated from each other when the catch 152 is in the blocking position. When in the release position, the catch 152 is out of or clear of the path of the rib 148a out of the corresponding slot 150, which allows the rib 148a to be withdrawn from the corresponding slot 150. Thus, the catch 152 allows the inner part 136 and the outer part 138 to be separated from each other when the catch 152 is in the release position.

The catch 152 is biased by the leaf spring 154 toward the blocking position such that the catch 152 returns to the blocking position from the release position when the person operating the catch 152 releases the catch 152. The leaf spring 154 is supported by the outer part 138. The leaf spring 154 is attached to the outer part 138 by having a tab 156 at one of its ends inserted between two posts 164 and 166 projecting up from the bottom 145 of the outer part 138. The catch 152 includes a lever 158 and a barb or hook 160. One arm 162 of the leaf spring 154 presses against the lever 158 of the catch 152 to bias the catch 152 toward the blocking position. The catch lever 158 is pivotally supported by a post 168 on the bottom 145 of the outer part 138. The barb 160 is saw tooth shaped with a flat 170 on the front side that blocks the rib 148a from being withdrawn from the corresponding slot 150 when the catch is in the blocking position and a bevel 172 on the backside that allows the catch 152 to be pushed out of the way when the rib 148a is being inserted into the corresponding slot 150.

The catch lever 158 has a hole 174 that has a cylindrical portion that rotationally mates with the cylindrical post 168 on the bottom 145 of the outer part 138 to allow for pivotal movement of the catch lever 158 at least between the blocking position and the release position. The hole 174 has a laterally extending portion or channel 176. The post 168 has a lateral projection 178 located at the top of the post 168. When the catch lever 158 and consequently the catch 152 are rotated to an angle beyond the release position, which is referred to herein as the disassembly position and is about thirty degrees in the illustrated example, the laterally extending portion 176 of the hole 174 aligns with the lateral projection 178 to allow removal and installation of the catch 152. The leaf spring 154 must be removed to allow the catch lever 158 to be rotated to the disassembly position.

In the illustrated embodiment, the bread support 102 is provided with bracing 182 and 184 to prevent the bread support 102 from rolling or tipping over on the counter top or other supporting surface. In the illustrated embodiment, the bracing 182 and 184 are in the form of sloping skirts that at least partially surround the inner part 136 and the outer part 138, respectively. More particularly, the bracing 182 and 184 are in the form of sloping skirts that at least surround the end walls of the inner part 136 and the outer part 138, respectively. In the illustrated embodiment, the bracing 184 is in the form of a sloping skirt that completely surrounds the outer part 138.

As an alternative, the rib 148a may be of the same length as the other ribs 148 but be provided with a notch that is can be engaged by the barb 160 through an opening in the corresponding slot 150 to thereby block removal of the rib 148a from the corresponding slot 150. As yet another alternative, the ribs 148 may be replaced with pins having heads that are larger in diameter than the shafts of the pins. Optionally, the slots 150 may be formed so as to extend through the material of the walls and bottom of the outer part 138. As yet another alternative, the bread support may be made of a plurality of pieces that are longitudinally hinged together to allow the bread support to aid in folding up the sandwich after fillings are added. The hinged pieces of the folding bread support may be made of one piece or of two pieces that are telescopically movable relative to each other.

It must be understood that all permutations of the features of the various disclosed embodiments are contemplated as being part of the present invention. It is to be understood that the present invention is not limited to the embodiments described above, but encompasses any and all embodiments within the scope of the following claims.

The invention claimed is:

1. A sandwich making utensil comprising:
a bread support for supporting a sandwich bread in the open configuration, wherein the bread support has opposite sides; and
clip means provided proximate the opposite sides of the bread support for engaging sides of opening formed in the bread in order to hold the bread in the open configuration,
wherein the clip means comprises at least a first blocking member and a second blocking member supported proximate the opposite sides of the bread support, wherein each of the first blocking member and the second blocking member is movable between an engaged position and a disengaged position, wherein said first blocking member and said second blocking member are capable of cooperatively holding the bread in the open configuration when both said first blocking member and said second blocking member are in their engaged positions, wherein said first blocking member and said second blocking member are farther apart from one another when both said first blocking member and said second blocking member are in their disengaged positions as compared to when both said first blocking member and said second blocking member are in their engaged positions, and wherein both said first blocking member and said second blocking member tend to remain in their disengaged positions once said first blocking member and said second blocking member are moved to their disengaged positions.

2. The sandwich making utensil according to claim 1, wherein said bread support is in the form of a tub or trough having a bottom, sidewalls, and end walls.

3. A sandwich making utensil comprising:
a bread support for supporting a sandwich bread in the open configuration, wherein the bread support has opposite sides; and
clip means provided proximate the opposite sides of the bread support for engaging sides of opening formed in the bread in order to hold the bread in the open configuration, wherein said bread support is adapted to be extendable or retractable in telescoping fashion so as to accommodate sandwich breads of different lengths.

4. A sandwich making utensil comprising:
a bread support for supporting a sandwich bread in the open configuration, wherein the bread support has opposite sides; and
clip means provided proximate the opposite sides of the bread support for engaging sides of opening formed in the bread in order to hold the bread in the open configuration, wherein said bread support can be extended or retracted to assume a length in a range between and including a minimum length and a maximum length, and wherein said maximum length is greater than said minimum length.

5. The sandwich making utensil according to claim 4, wherein said bread support is in at least two parts including an inner part and an outer part, wherein said inner part and outer part are capable of sliding movement relative to each other to provide for extension and retraction of said bread support.

6. The sandwich making utensil according to claim 5, further comprising inter-engaging ribs and slots for allowing said sliding movement, wherein the bread support has a longitudinal axis, and wherein said sliding movement is limited to translation along said longitudinal axis of said bread support.

7. The sandwich making utensil according to claim 6, wherein said clip means comprises at least a first clip and a second clip, wherein said bread support has a first side and a second side, wherein said first clip is pivotally attached to said bread support proximate said first side of said bread support at a pivotal attachment, wherein said first clip is pivotally movable between an engaged position and a disengaged position,
wherein said second clip is pivotally attached to said bread support proximate said second side of said bread support at a pivotal attachment, wherein said second clip is pivotally movable between an engaged position and a disengaged position, and
wherein said first clip and said second clip are capable of cooperatively holding the bread in the open configuration, when both said first clip and said second clip are in their engaged positions.

8. The sandwich making utensil according to claim 7, wherein each of said first clip and said second clip has a pivot arm that has first and second ends, a sleeve portion attached to said pivot arm at said first end of said pivot arm, and a blocking member attached to said pivot arm at said second end of said pivot arm, said blocking member at least in part extending laterally from said pivot arm, and wherein said blocking member is adapted to block a corresponding side of the opening in the bread from moving to a position corresponding to a closed configuration of the bread when said first clip and said second clip are in their engaged positions.

9. The sandwich making utensil according to claim 8, further comprising:
a first detent adapted to selectively engage said first clip to maintain said first clip in said engaged position of said first clip; and
a second detent adapted to selectively engage said second clip to maintain said second clip in said engaged position of said second clip.

10. The sandwich making utensil according to claim 9, wherein each of said first clip and said second clip further comprises a lever portion attached to the corresponding one of said first clip and said second clip proximate a corresponding one of said pivotal attachment of said first clip to said bread support and said pivotal attachment of said second clip to said bread support, and wherein said lever portion of each of said first clip and said second clip is capable of being used by a user to force a corresponding one of said first clip and said second clip to said disengaged position thereof.

11. The sandwich making utensil according to claim 5, wherein said clip means comprises at least a first clip, a second clip, a third clip and a fourth clip, wherein said bread support has a first side and a second side, wherein each of said inner part and said outer part has a first side and a second side corresponding to said first side of said bread support and said second side of said bread support, respectively, wherein said first clip is pivotally attached to said inner part proximate said first side of said inner part at a first pivotal attachment, wherein said second clip is pivotally attached to said inner part proximate said second side of said inner part at a second pivotal attachment, wherein said first clip and said second clip are each pivotally movable between an engaged position and a disengaged position,
wherein said third clip is pivotally attached to said outer part proximate said first side of said outer part at a third pivotal attachment, wherein said fourth clip is pivotally attached to said outer part proximate said second side of said outer part at a fourth pivotal attachment, wherein said third clip and said fourth clip are each pivotally movable between an engaged position and a disengaged position, and
wherein said first clip, said second clip, said third clip, and said fourth clip are capable of cooperatively holding the bread in the open configuration, when said first clip, said second clip, said third clip, and said fourth clip are in their engaged positions.

12. The sandwich making utensil according to claim 11, wherein each of said first clip, said second clip, said third clip, and said fourth clip has a pivot arm that has first and second ends, a sleeve portion attached to said pivot arm at said first end of said pivot arm, and a blocking member attached to said pivot arm at said second end of said pivot arm, said blocking member at least in part extending laterally from said pivot arm, and wherein said blocking member is adapted to block a corresponding side of the opening in the bread from moving to a position corresponding to a closed configuration of the bread when said first clip, said second clip, said third clip, and said fourth clip are in their engaged positions.

13. The sandwich making utensil according to claim 6, wherein said ribs are provided on one of said inner part and said outer part and said slots are provided on another one of said inner part and said outer part.

14. The sandwich making utensil according to claim 13, wherein said ribs have a T shaped cross section, wherein said slots have a T shaped cross section, and wherein each of said slots receives at least a portion of a respective one of said ribs for sliding movement therein.

15. The sandwich making utensil according to claim 13, wherein each of said slots is dimensioned and configured to receive at least a portion of a respective one of said ribs for sliding movement therein, and wherein each of said slots receives at least a portion of a respective one of said ribs for sliding movement therein.

16. The sandwich making utensil according to claim 11, further comprising:
a first detent adapted to selectively engage said first clip to maintain said first clip in said engaged position of said first clip;
a second detent adapted to selectively engage said second clip to maintain said second clip in said engaged position of said second clip;
a third detent adapted to selectively engage said third clip to maintain said third clip in said engaged position of said third clip; and
a fourth detent adapted to selectively engage said fourth clip to maintain said fourth clip in said engaged position of said fourth clip.

17. The sandwich making utensil according to claim 11, wherein each of said first clip, said second clip, said third clip, and said fourth clip further comprises a lever portion attached to the corresponding one of said first clip, said second clip, said third clip, and said fourth clip proximate a corresponding one of said first pivotal attachment, said second pivotal attachment, said third pivotal attachment, and said fourth pivotal attachment, and wherein said lever portion of each of said first clip, said second clip, said third clip, and said fourth clip is capable of being used by a user to force a corresponding one of said first clip, said second clip, said third clip, and said fourth clip to said disengaged position thereof.

18. The sandwich making utensil according to claim 5, further comprising a releasable catch mechanism that is capable of keeping said inner part and said outer part from separating completely during normal operation but that can be operated by a person to allow said inner part to be separated from said outer part for cleaning purposes.

* * * * *